US012379326B2

(12) United States Patent
Liu et al.

(10) Patent No.: US 12,379,326 B2
(45) Date of Patent: Aug. 5, 2025

(54) DARK-FIELD MICROSCOPY IMAGING APPARATUS

(71) Applicants: Brookhaven Science Associates, LLC, Upton, NY (US); The Trustees of Columbia University in the City of New York, New York, NY (US)

(72) Inventors: Mingzhao Liu, Syosset, NY (US); Justine E. Haupt, Mattituck, NY (US); Connie-Rose Mai Deane, Moriches, NY (US); Oleg Gang, Setauket, NY (US)

(73) Assignees: The Trustees of Columbia University in the City of New York, New York, NY (US); United States Department of Energy, Washington, DC (US)

( * ) Notice: Subject to any disclaimer, the term of this patent is extended or adjusted under 35 U.S.C. 154(b) by 183 days.

(21) Appl. No.: 17/745,506

(22) Filed: May 16, 2022

(65) Prior Publication Data

US 2022/0365000 A1 Nov. 17, 2022

Related U.S. Application Data

(60) Provisional application No. 63/189,665, filed on May 17, 2021.

(51) Int. Cl.
*G01N 21/95* (2006.01)
*G01N 21/88* (2006.01)
*G01N 21/956* (2006.01)

(52) U.S. Cl.
CPC ..... *G01N 21/9501* (2013.01); *G01N 21/8806* (2013.01); *G01N 21/95684* (2013.01); *G01N 2021/8822* (2013.01)

(58) Field of Classification Search
CPC .......... G01N 21/9501; G01N 21/8806; G01N 21/95684; G01N 2021/8822
See application file for complete search history.

(56) References Cited

U.S. PATENT DOCUMENTS 11,156,822 B2 * 10/2021 Lyuboshenko ...... H04N 23/675
2018/0258468 A1 * 9/2018 Sun ........................ G02B 21/06

* cited by examiner

*Primary Examiner* — Hung V Nguyen
(74) *Attorney, Agent, or Firm* — Baker Botts LLP

(57) ABSTRACT

An apparatus includes a main body, circuit assembly, lens, and clamping assembly. The main body includes an aperture that receives a wafer configured to receive a sample under study. The main body is configured to support the circuit assembly, which includes illumination sources that emit light of different colors such that total internal reflection is generated in the wafer. The main body is configured to provide support for the lens, and the clamping assembly mechanically coupled to the main body such that the lens is selectively positionable with respect to a camera lens. A microscopy imaging apparatus includes an illumination source, wafer, and charge-coupled device. The illumination source is configured to emit white light such that total internal reflection is generated in the wafer. The sample under study is disposed between the wafer and the charge coupled device, and the charge coupled device is configured to obtain an image of the sample under study upon illumination of the wafer by the illumination source.

20 Claims, 32 Drawing Sheets

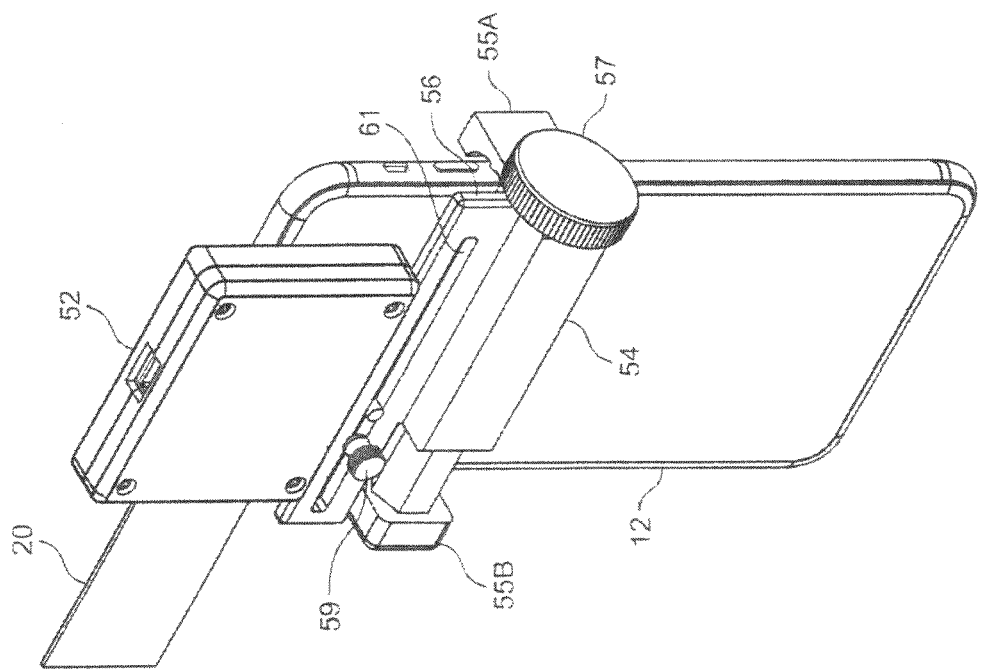
FIG. 10E
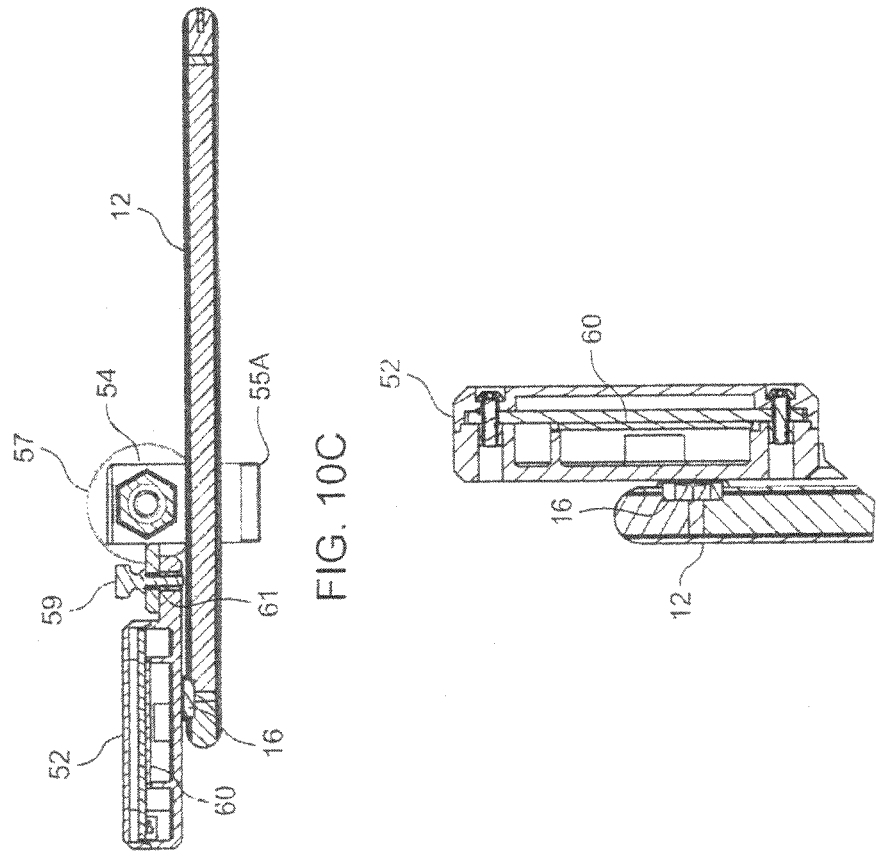
FIG. 10C
FIG. 10D

DARK-FIELD MICROSCOPY IMAGING APPARATUS

CROSS-REFERENCE TO RELATED APPLICATION

This application claims the benefit of and priority to, U.S. Provisional Application No. 63/189,665, filed May 17, 2021, the disclosure of which is incorporated by reference herein in its entirety.

The present invention was made with government support under contract number DE-SC0012704 awarded by the U.S. Department of Energy. The United States government may have certain rights in this invention.

BACKGROUND

The disclosed embodiments generally relate to a dark-field microscopy imaging apparatus for use with smart devices, charge coupled devices, and complementary metal oxide semiconductor (CMOS) sensors.

SUMMARY

The disclosed embodiments relate to a dark-field microscopy imaging apparatus, which includes a main body, circuit assembly, lens, and clamping assembly. The main body includes an aperture configured to receive a wafer, and the wafer is configured to receive a sample under study. The main body is configured to support the circuit assembly, and the circuit assembly includes illumination sources that emit light of different colors such that total internal reflection is generated in the wafer. The main body is configured to provide support for the lens, and the clamping assembly is mechanically coupled to the main body such that the lens is selectively positionable with respect to a camera lens that can, for example, be associated with a smart device upon affixing the clamping assembly to the smart device, or a printed circuit board (PCB) camera.

The circuit assembly may include a processing device configured to control at least one of illumination intensity associated with the illumination sources, illumination timing associated with the illumination sources, focusing the lens to enhance spectral resolution of the sample under study. The circuit assembly may include a blocking structure directing illumination from the illumination sources, and the blocking structure may be at least one of disposed on a side of the wafer opposing at least one of the illumination sources, between the at least one of the illumination sources and the side of the wafer. The blocking structure may be at least one of statically positionable, manually positionable, remotely positionable. The blocking structure may include at least one of a baffling structure, prism, lens, mirror, light guide. The apparatus may locate a feature of interest associated with the sample under study based on a spectral characteristic, and areas of interest may be defined based on the spectral characteristic within the areas of interest. The defined areas of interest may be ranked based on the spectral characteristic, and a center of a field-of-view associated with the camera lens may be repositioned at a center of a defined area of interest having a highest ranking. A digital zoom associated with a smart device may be adjusted to fill the field-of-view with the defined area of interest having the highest ranking. The spectral characteristic may include at least one of object density, size, and shape associated with a feature of interest. The clamping assembly may include a slider assembly, and the clamping assembly and slider assembly may be configured to enable selective positioning of the lens with respect to the camera lens in at least two dimensions or three dimensions. The wafer may include at least one slanted side forming an angle other than 90 degrees with respect to at least one of a top of the wafer, a bottom of the wafer.

The disclosed embodiments further relate to a microscopy imaging apparatus, which includes an illumination source, wafer, and charge-coupled device. The wafer is configured to receive a sample under study, and the illumination source is configured to emit white light such that total internal reflection is generated in the wafer. The sample under study is disposed between the wafer and the charge coupled device, and the charge coupled device is configured to obtain an image of the sample under study upon illumination of the wafer by the illumination source.

The disclosed embodiments yet further relate to a method of dark-field microscopy imaging, which includes receiving a wafer in an aperture of a main body, wherein the wafer is configured to receive a sample under study; supporting a circuit assembly using the main body; emitting light of different colors by illumination sources such that total internal reflection is generated in the wafer; supporting a lens using the main body; and mechanically coupling a clamping assembly to the main body such that the lens is selectively positionable with respect to a camera lens that can, for example, be associated with a smart device upon affixing the clamping assembly to the smart device, or a PCB camera.

The method may also include controlling at least one of illumination intensity associated with the illumination sources, illumination timing associated with the illumination sources, focusing the lens to enhance spectral resolution of the sample under study. The method may also include directing illumination from the illumination sources using a blocking structure at least one of disposed on a side of the wafer opposing at least one of the illumination sources, between the at least one of the illumination sources and the side of the wafer, and the blocking structure may be at least one of statically positionable, manually positionable, remotely positionable. The blocking structure may include at least one of a baffling structure, prism, lens, mirror, light guide. The method may include locating a feature of interest associated with the sample under study based on a spectral characteristic; illuminating at least one of the illumination sources; defining areas of interest based on the spectral characteristic within the areas of interest; ranking the defined areas of interest based on the spectral characteristic; repositioning a center of a field-of-view associated with the camera lens at a center of a defined area of interest having a highest ranking; and adjusting a digital zoom associated with a smart device to fill the field-of-view with the defined area of interest having the highest ranking. The spectral characteristic may include at least one of object density, size, and shape associated with a feature of interest. The method may also include selectively positioning the lens with respect to the camera lens in at least two dimensions or three dimensions using the clamping assembly and a slider assembly. The wafer may include at least one slanted side forming an angle other than 90 degrees with respect to at least one of a top of the wafer, a bottom of the wafer.

The disclosed embodiments still further relate to a dark-field microscopy imaging method, which includes emitting white light using an illumination source such that total internal reflection is generated in a wafer, wherein the wafer is configured to receive a sample under study; and obtaining an image of the sample under study using a charge coupled device upon illumination of the wafer by the illumination source. The sample under study is disposed between the wafer and the charge coupled device.

Other embodiments will become apparent from the following detailed description considered in conjunction with the accompanying drawings. It is to be understood, however, that, the drawings are designed as an illustration only and not as a definition of the limits of any of the embodiments.

BRIEF DESCRIPTION OF THE DRAWINGS

The following drawings are provided by way of example only and without limitation, wherein like reference numerals (when used) indicate corresponding elements throughout the several views, and wherein:

FIG. 10C is a side cross-sectional view of the embodiment of the dark-field microscopy imaging apparatus mounted on the smart device as seen from section CC shown in FIG. 10B;

FIG. 10D is a side cross-sectional view of the embodiment of the dark-field microscopy imaging apparatus mounted on the smart device as seen from section AA shown in FIG. 11A;

FIG. 10E is a front perspective view of the embodiment shown in FIG. 10A:

It is to be appreciated that elements in the figures are illustrated for simplicity and clarity. Common but well-understood elements that are useful (it necessary in a commercially feasible embodiment are not shown in order to facilitate a less hindered view of the illustrated embodiments.

DETAILED DESCRIPTION

In recent years, digital photography using smart devices such as, but not limited to, smart phones, phablets, tablets, smart watches, smart glasses, and other electronic devices interconnected with networks using wireless protocols such as, but not limited to, Bluetooth. Zigbee, NFC. Wi-Fi, LiFi, 5G, and the like has seen rapid popularization. This trend has catalyzed the development of smart device-based optical microscopy using various after-market optical accessories. These developments generally take advantage of a very small pixel size, which is typically about 1 micrometer, associated with a camera or imaging unit in the smart device.

As a result, a large apparent magnification, which is typically about 100×, can be achieved even when coupled with a low-cost, low-magnification lens, which is typically referred to as an objective lens. However, conventional realizations are generally limited to bright-field imaging, rather than dark-field imaging, since the latter typically requires unique illumination techniques that restrict light incident to the specimen from entering the imaging device. In many cases, a feature of interest is very small and has a low index of refractive contrast against a background. To effectively resolve these issues, an intense illumination is typically required. However, conventional realizations of smart device-based dark-field microscopy use ambient light, which cannot resolve small, weakly scattering features.

Figure 1:
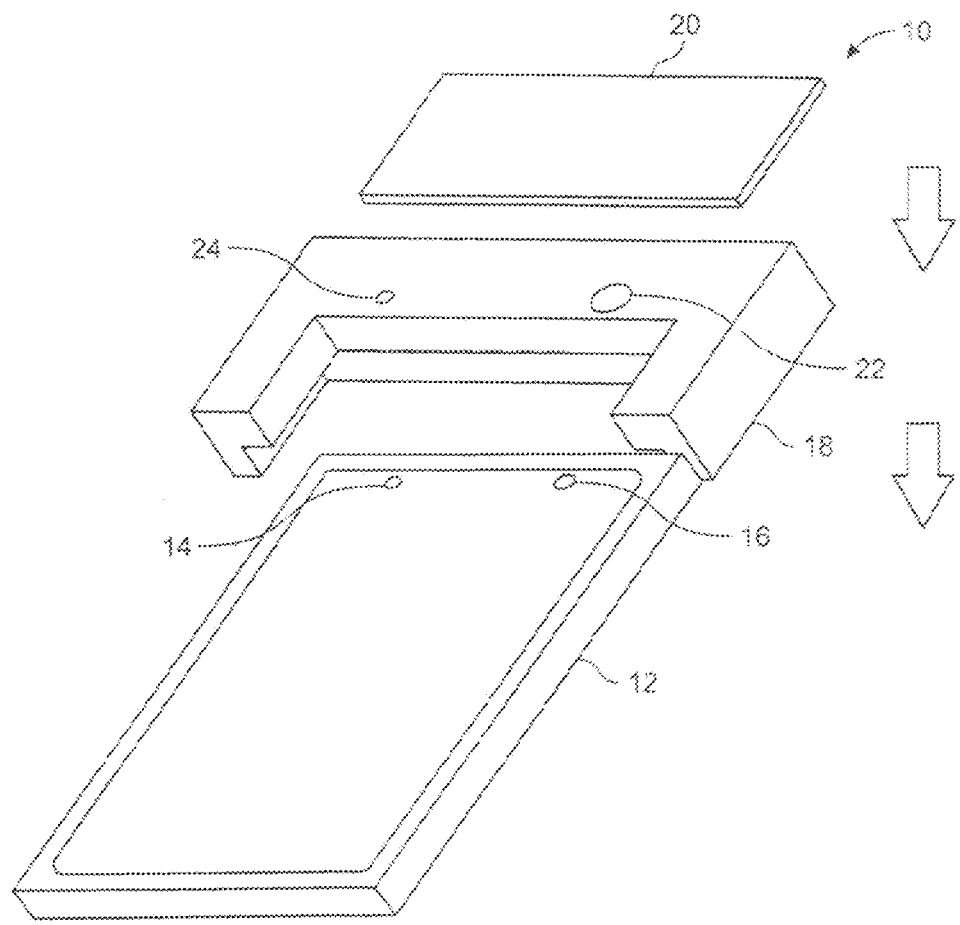
FIG. 1 is an exploded view of an embodiment of a dark-field microscopy imaging apparatus used in conjunction with, for example, a smart device.

An embodiment of a dark-field microscopy imaging apparatus 10 shown in FIG. 1 is configured to be attached to a smart device 12 that enables dark-field microscopy imaging with illumination provided by, for example, a flashlight 14 associated with the smart device 12. The smart device 12 includes a camera 16 and the flashlight 14 shown in FIG. 1. The apparatus 1) includes the following components.

(1) A main body 18, which is removably attached to the smart device 12, provides physical support to a sample of investigation disposed on a wafer 20, and is used as a host for the remaining components of the apparatus 10.

(2) An optical lens 22 such as, but not limited to, a positive lens, convex lens, concave lens, glass bead. Fresnel lens, and/or the like, is used as a microscopic objective lens. When the optical lens 22 is positioned in front of the camera 16 associated with the smart device 12, an optical microscope is formed. The optical lens 22 can be made from a wide range of transparent materials such as, but not limited to, glass, plexiglass, and/or the like, and can be made in various forms such as, but not limited to, a positive lens, glass bead, camera lens assembly extracted from or for use in another camera or smart device, and/or the like. The camera lens assembly may be implemented using, for example, an iPhone 6s Rear Camera Replacement (sku #9-AP-2335; commercially available from Megafixit 2764 N. Green Valley Pkwy, #159 Henderson, NV 89014 (www.meafixit.com/products/iphone-6s-rear-camera-replacement).

Figure 2:
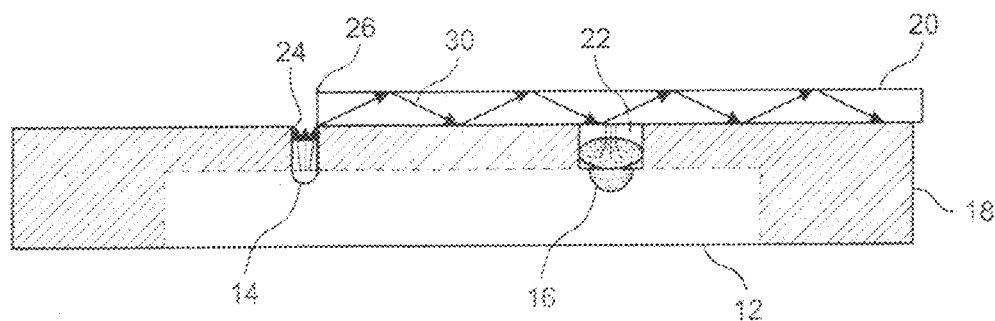
FIG. 2 is a side cross-sectional view of the embodiment shown in FIG. 1 illustrating dark-field illumination provided by a total internal reflection (TIR) mode inside a wafer with light coupling through light scattering at a side of the wafer.
Figure 3:
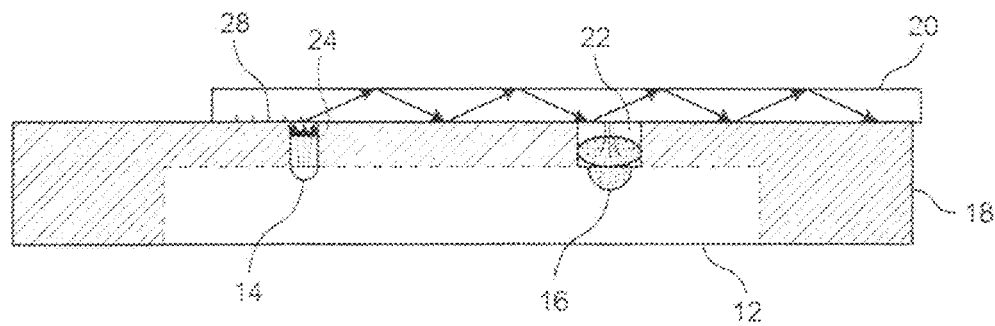
FIG. 3 is a side cross-sectional view of the embodiment shown in FIG. 1 illustrating dark-field illumination provided by a IR mode inside the wafer with light coupling through light scattering at grooves of the wafer.
Figure 4:
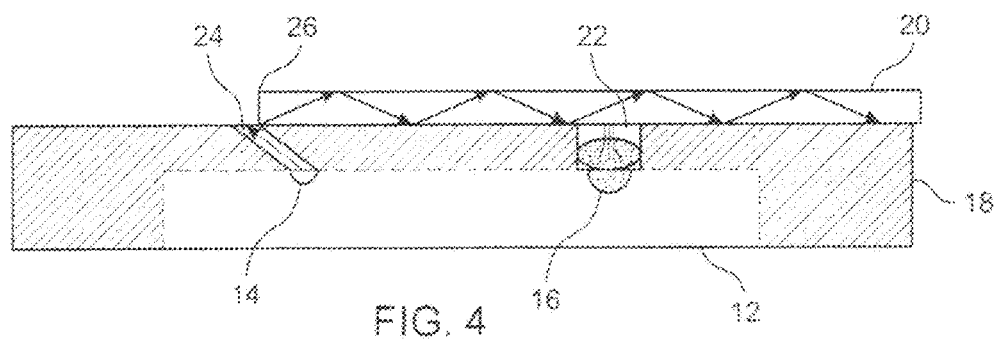
FIG. 4 is a side cross-sectional view of the embodiment shown in FIG. 1 illustrating dark-field illumination provided by a TIR mode inside the wafer with light coupling through an illumination path formed using a light guide at least partially filled with at least semi-transparent material at a side of the wafer.

(3) An illumination path 24 in the main body 18 guides light emitted from the flashlight 14 to achieve dark-field illumination. The illumination path 24 can take various shapes such as, but not limited to, cylindrical, conical, and/or the like. Thus, an embodiment of the illumination path 24 can include an aperture in the main body 18 as shown in FIGS. 1-4. The illumination path 24 can be made from or at least partially filled with one or more transparent materials such as, but not limited to glass, plexiglass, a plastic bead, a polymer, an elastomer, and/or the like to form the light guide, as shown in FIG. 4.

(4) A wafer 20 that includes at least two substantially smooth, parallel surfaces such as, but not limited to, a microscope slide acts as a carrier for a specimen under study. Optical guiding modes are established between the surfaces using total internal reflection (TIR). Illumination from the flashlight 14 is coupled to one or more TIR modes by optical scattering structures at or near one of the two surfaces. The optical scattering structures may include, for example, a side 26 of the wafer 20, as shown in FIGS. 2 and 4, or other optical defects configured in or on one or more of the two surfaces such as, but not limited to, holes, grooves, pits 28, and/or the like, as shown in FIG. 3. The TIR-guided light 30 is substantially trapped in the wafer 20, but is not collected by the dark-field microscopy imaging apparatus 10. An evanescent field associated with the TIR-guided light 30, which extends a few hundred nanometers from the wafer 20, interacts with the specimen under study, and is outwardly scattered from the wafer 20. The scattered light is then collected by the dark-field microscopy imaging apparatus 10 to facilitate dark-field imaging, as shown in FIGS. 2-4.

In FIG. 2, for example, the main body 18 is disposed above the smart device 12, and the wafer 20 is disposed above the main body 18. The optical lens 22 and illumination path 24 associated with the main body 18 are aligned with the camera 16 and flashlight 14 of the smart device 12, respectively. This alignment enables light emitted by the flashlight 14 to pass through the illumination path 24 associated with the main body 18 to the wafer 20. This alignment also enables an image of the specimen under study to be obtained by the camera 16 associated with the smart device 12 through the optical lens 22 associated with the main body 18. Thus, in FIG. 2, light emitted by the flashlight 14 passes through the illumination path 24 and impinges on a side 26 of the wafer 20, which enables propagation of the impinging light through the wafer as TIR-guided light 30.

Alternatively, the camera 16 associated with the smart device 12 can be replaced with a printed circuit board (PCB) camera (not shown). The PCB camera can then be controlled using, for example, the smart device 12 or a computer by means known in the art. (see https://www.raypeb.com/pcb-camera/). PCB cameras represent a type of small-footprint camcorder that provide enhanced implementation flexibility. With optical gadgets and picture sensors mounted straightforwardly on a camera circuit hoard, manufacturers can eliminate conventionally required components to provide a space-saving solution. Use of the PCB camera advantageously enables the main body, and/or circuit assembly disposed therein or thereon, to be electrically and mechanically coupled to the PCB camera, which is substantially smaller and lighter than the smart device 12.

Similarly, in FIG. 3, light emitted by the flashlight 14 passes through the illumination path 24 and impinges on grooves or pits 28 on the wafer 20, which enables propagation of the impinging light through the wafer as the TIR-guided light 30.

Likewise, in FIG. 4, light emitted by the flashlight. 14 passes through the illumination path 24, which may be at least partially filled with at least a partially transparent material, and impinges on the side 26 of the wafer 20, which enables propagation of the impinging light through the wafer as the TIR-guided light 30.

Figure 6:
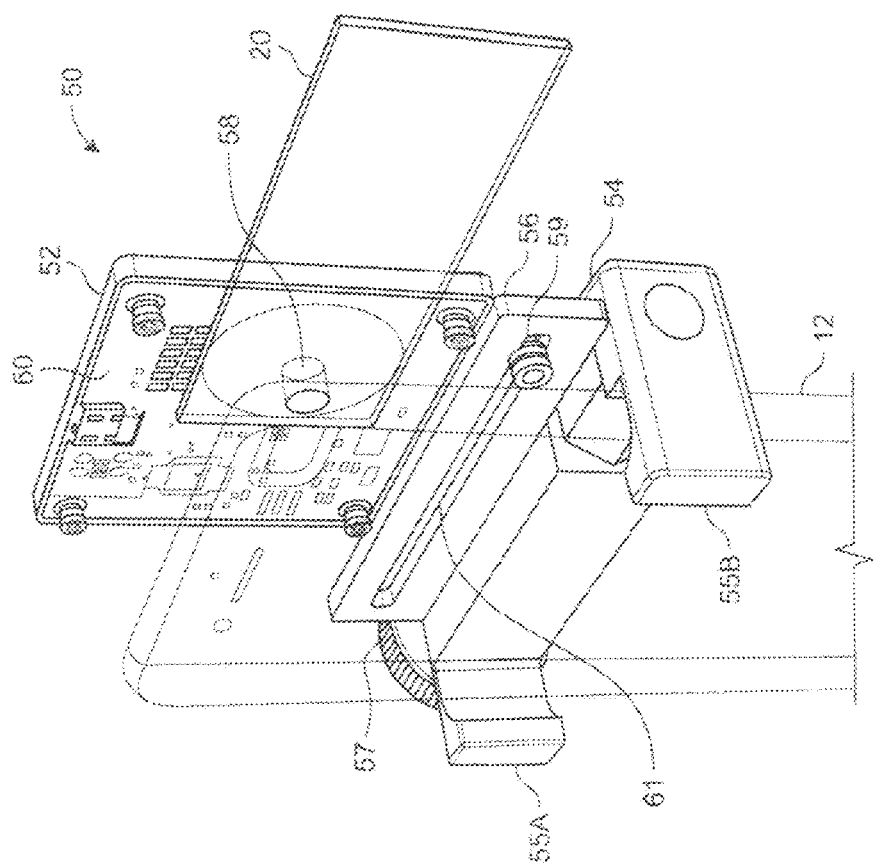
FIG. 6 is an enlarged side perspective view of the embodiment shown in FIG. 5, in which portions of the smart device and enclosure are rendered semi-transparent to show additional features of the clamping assembly, slider assembly, wafer, positive lens, and circuit board not shown in FIG. 5.
Figure 5:
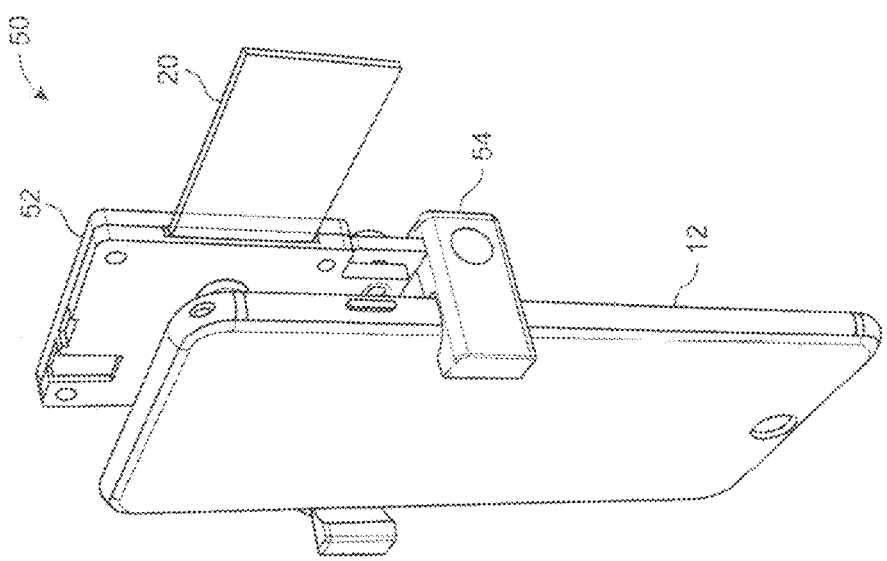
FIG. 5 is a side perspective view of an embodiment of the dark-field microscopy imaging apparatus showing the wafer, clamping assembly, smart device, and enclosure housing a circuit board and positive lens.

FIG. 5 shows an embodiment of the apparatus 50 including the wafer 20, smart device 12, clamping assembly 54, and main body or enclosure 52 for the circuit board and optical lens. FIG. 6 shows a partial cut-away view of the embodiment shown in FIG. 5, in which portions of the smart device 12 and enclosure 52 have been rendered transparent to illustrate additional features not shown in FIG. 5, such as a circuit board 60 and optical lens 58.

Figure 7:
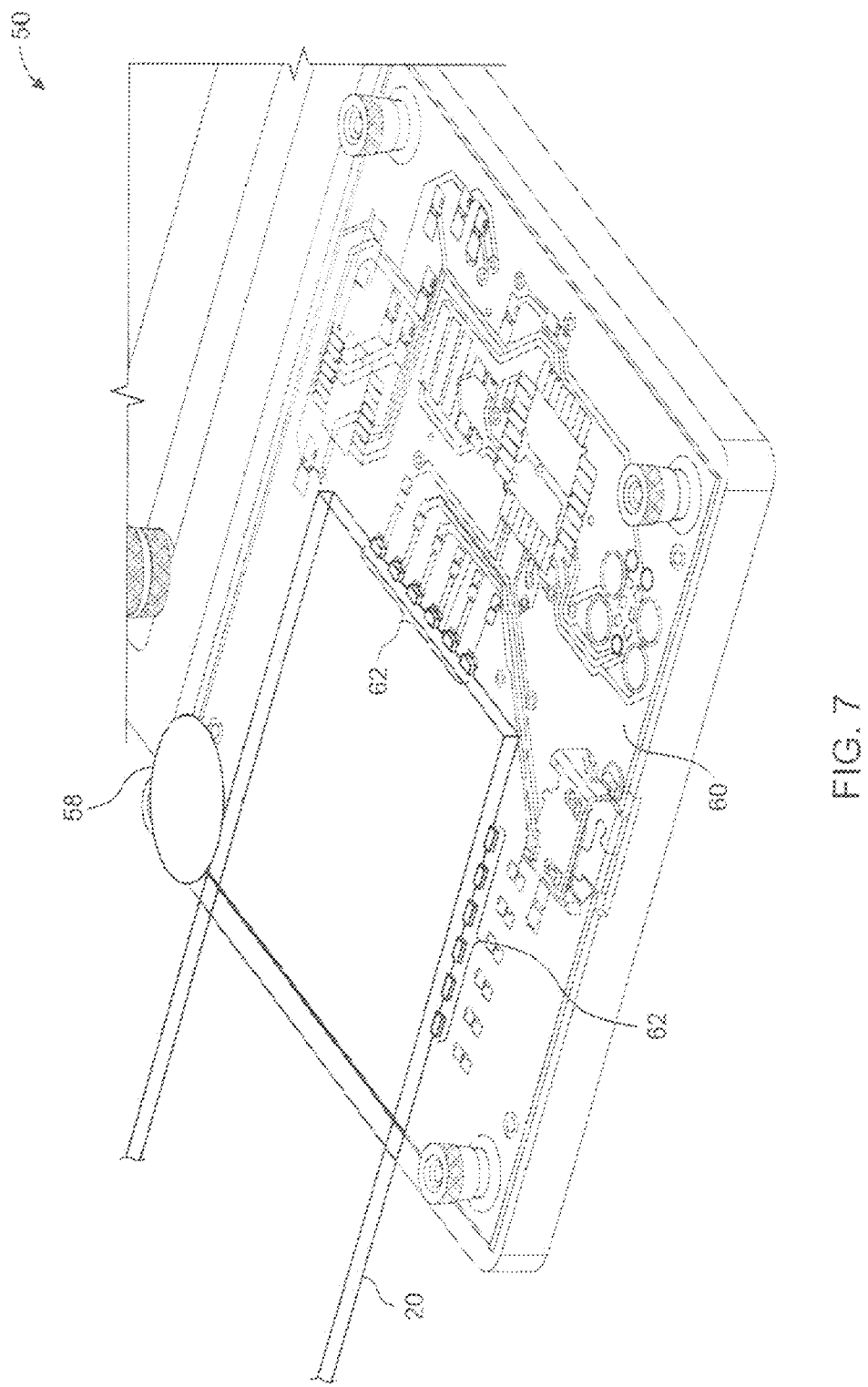
FIG. 7 is a top perspective view of an embodiment of the circuit board shown in FIG. 6 with the wafer disposed in a test position.

FIG. 7 shows an enlarged view of the circuit board 60 with the wafer 20 disposed in a viewing position. The proximity of one or more illumination sources such as, but not limited to, surface-mounted LEDs 62, provides for optical coupling into one or more sides of the wafer 20, thereby distributing and homogenizing the light emitted by the LEDs 62 as a result of total internal reflection (TIR). One or more embodiments of the dark-field microscopy imaging apparatus 50 shown in FIGS. 5-7 include the following components.

(1) A main body 52 is attached to the smart device 12, which provides physical support for the wafer 20. The main body 52 may include one or more adjustable clamping assemblies 54 and one or more positioning components, such as a slider assembly 56 shown in FIG. 6, which enable alignment of the optical lens 58 associated with the main body 52 with the camera 16 associated with the smart device 12. The main body 52 houses and provides structural support for the remaining components of the apparatus 50.

(2) An optical lens 58 such as, but not limited to, a positive lens, convex lens, concave lens, glass bead, Fresnel lens, and/or the like, is used as a microscope objective and mounted to the main body 52. When the optical lens 58 is placed in front of the camera of the smart device 12, an optical microscope is formed. The optical lens 58 can be manufactured from one or more of a wide range of transparent materials such as, but not limited to, glass, plexiglass, and/or the like, and in various forms such as, but not limited to, a positive lens, glass bead, camera lens assembly extracted from or for use in another camera or smart device, and/or the like.

(3) A circuit board 60 is mounted in the main body 52. The circuit board 60 may be self-powered, powered by an external power supply, and/or powered by a smart device, which may or may not be the same smart device 12 used for imaging. The circuit board 60 includes one or more electronic ports and/or connectors that provide a power and communication interface. The circuit board 60 controls operation of the on-board light emitting diodes (LEDs) 62 shown in FIG. 7. An emission spectrum of the LEDs 62 may be either broadband such as, but not limited to, white light, or narrowband such as, but not limited to, a single color of light such as, but not limited to red, blue, and/or green, and may include multiple narrowband sources, which provide multispectral imaging that can be enabled in conjunction with a tri-color or monochromatic camera. The color of light is selected based on scattering properties associated with scattering objects to be studied such as, but not limited to, nanoparticles. One or more multi-color LED(s) can be used in conjunction with an algorithm to optimize color output. The color of light may be configured during manufacturing based on an intended object to be detected color. The user can also select which color of LED(s) to illuminate under software control.

(4) A wafer 20 that includes at least two substantially smooth and parallel surfaces such as, but not limited to, a microscope slide, is used as a carrier for the specimen under study. As shown in FIG. 7, upon placing the wafer 20 into the test position within a space defined by the main body 52, optical lens 58, and circuit board 60, at least one edge of the wafer 20 is disposed adjacent to one or more of the LEDs 62 attached to the circuit board 60. Upon illumination of one or more of the LEDs 62, the emitted light enters the wafer 20 from at least one side of the wafer 20. Optical guidance modes are established between two surfaces of the wafer 20 in accordance with total internal reflection (TIR). The TIR-guided light is trapped in the wafer 20, but is not appreciably collected by the apparatus 50. However, an evanescent field, which extends a few hundred nanometers from the wafer 20, interacts with the specimen understudy and is outwardly scattered from the wafer 20. The scattered light is collected by the apparatus 50 to enable dark-field imaging.

The apparatus 50 is configurable for universal adaptability to a wide variety of smart devices 12 in at least two dimensions by using, for example, the clamping assembly 54 and slider assembly 56. The clamping assembly 54 includes at least two arms 55A-B that affix the main body 52 to the smart device 12 by adjusting and fixing a distance between the arms 55A-B using a tensioning dial 57. The tensioning dial 57 adjusts the distance between the arms 55A-B depending on the direction that the tensioning dial 57 is rotated. For example, the arms 55A-B are drawn closer together by rotating the tensioning dial 57 clockwise, thereby clamping the main body 52 to the smart device 12. Alternatively, the arms 55A-B are separated by rotating the tensioning dial 57 counter-clockwise, thereby releasing the main body 52 from the smart device 12. By positioning the main body 52 in a first dimension along a length of the smart device 12 and rotating the tensioning dial 57 clockwise, the main body 52, and thus the positive lens 58, are aligned and fixed with respect to the camera 16 associated with the smart device 12 in the first dimension. A distance between the optical lens 58 and clamping assembly 54 is configured such that the arms 55A-13 come in contact with the smart device 12 below and/or above any button that may be disposed on one or more sides of the smart device 12 so as not to interfere with operation of the button. That is, the dimensions of the apparatus 50 are configured such that the optical lens 58 can be aligned with the camera 16 while the arms 55A-B are fixed at a position along the smart device 12 below and/or above any button 53.

The slider assembly 56 includes a slider set screw 59 that fixes the circuit board 60 in a second dimension at a desired position along a slot 61, through which the slider set screw 59 passes. By loosening the slider set screw 59, positioning the main body 52 in the second dimension along the slot 61 or width of the smart device 12, and rotating the slider set screw 59 clockwise in the slot 61, the main bod 52, and thus the positive lens 58, are aligned and fixed with respect to the camera 16 associated with the smart device 12 in the second dimension.

FIG. 7 shows an exploded view of a portion of FIG. 6, in which the LEDs 62 are mounted on the circuit board 60 that controls multispectral imaging while defining a receiving area for the wafer 20. The LEDs 62 are mounted adjacent to one or more sides of the wafer 20 to enable propagation of light through the wafer in accordance with TIR.

One or more embodiments of the apparatus 50 operate by the optical lens 58 passing an image into the camera 16 associated with the smart device 12, if the optical lens 58 is selected such that its focal length matches that of the camera, a one-to-one imager is created, in which microscopic resolution is determined by a pixel pitch associated with the camera in the smart device 12, which is typically about 1 µm. An imaging plane of the optical lens 58 is configured to be disposed on a top surface of the wafer 20. The proximity of the LEDs 62 to one or more sides of the wafer 20 permits light to couple into the water 20. The emitted light then propagates and homogenizes throughout the wafer 20 in accordance with total internal reflection. The emitted light also couples to the sample under study on the surface of the wafer 20 with any substantial illumination of the circuit board 60, thereby creating dark-field illumination. A matteblack silkscreen on the circuit board 60 further suppresses background light while improving the dark-field imaging quality.

By illuminating specific LEDs 62 sequentially (i.e., illuminating only one color of one or more LEDs at any given time) images are captured with a higher spectral resolution than would be possible using a conventional tri-color or monochromatic camera due to minimizing cross-talk between different color signals. Conventional tricolor cameras capture a relatively broad bandwidth of light with substantial spectral overlap between bands. However, the use of narrow band LEDs in a time sequential fashion minimizes this signal overlap in accordance with the disclosed embodiments, which captures an image using a single color of LED(s). Bandwidth is determined by the illumination source, and thus capturing images is performed by sequentially illuminating a single color of LED(s) at any given time. LED lighting characteristics and sequencing are controlled using a program or application executed on or accessed by the smart device 12. Focus of the positive lens 58 may be controlled by a program or application executed on or accessed by the smart device.

Figure 8:
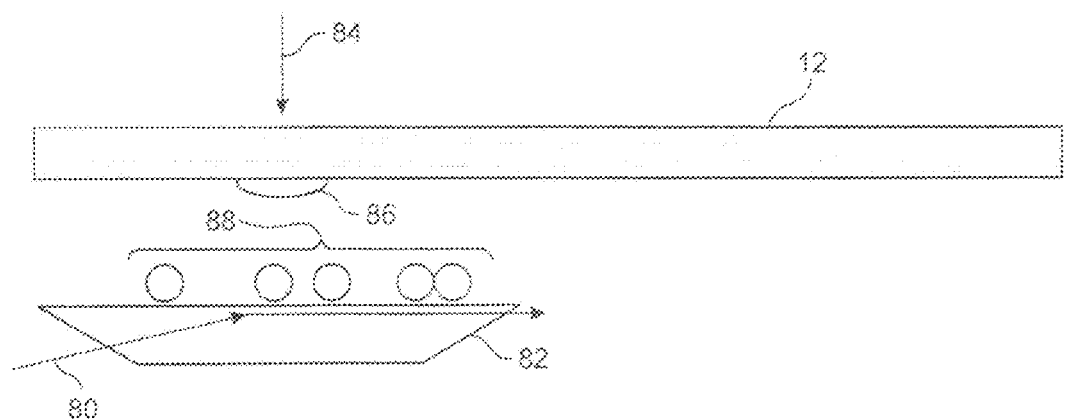
FIG. 8 is a side view of an embodiment of the dark-field microscopy imaging apparatus showing an illumination path through an embodiment of the wafer that includes prismatic characteristics.

FIG. 8 shows a side view of an embodiment in which, for example, white light 80 is directed at an angle with respect to a side of a wafer 82, on which nanoparticles 88 to be imaged are disposed that results in total internal reflection (TIR). Thus, the white light 80 impinges on, for example a side of the wafer 82 and propagates substantially perpendicular or normal to an observation axis 84 directed from the camera 86 to enable dark-field imaging using the TIR mode. The TIR mode creates a scattering zone in an evanescent field of a few hundreds of nanometers, which enables probing and maintaining dark-field conditions of the nanoparticles 88. The field-of-view is typically 1 mm2. A white LED, which is typically 1-2 mm in width, is used for illumination, which alleviates issues with using the flashlight associated with the imaging smart device The wafer 82 is illustrated with prismatic characteristics as a result of slanted sides that form angles other than 90 degrees with respect to a top and bottom of the wafer 82. The angle is optimized for the propagation of light parallel to the surface using optical analysis such as, but not limited to, ray tracing and/or non-sequential analysis, to calculate an edge bevel specification given a desired refraction index, for example, following which waters are manufactured in accordance with this specification.

These features advantageously minimize light scattering and loss so that light impinging on the wafer 82 is more efficiently contained within the wafer 82 in accordance with TIR. In addition, various combinations of a slanted or straight side, top, and/or bottom of the wafer may be used to minimize parasitic scattering. For example, light impinging on a slanted side opposing a straight side with a non-parallel top and bottom, a non-parallel top and bottom converging or diverging toward the side on which light is impinging, and/or or a non-parallel top and bottom converging or diverging from right to left when viewed from a side on which light is impinging may be used to achieve these benefits. To further ensure that the impinging light is constrained within the wafer 82, a light guide or coupling, which may be partially or entirely filled with at least a semi-transparent material such as, but not limited to, a polymer and/or elastomer may be used. Alternatively, a rectangular wafer 20, as shown in FIGS. 1-7 may be used with sides forming substantially 90 degree angles with respect to the top and bottom of the wafer 20.

Figure 9:
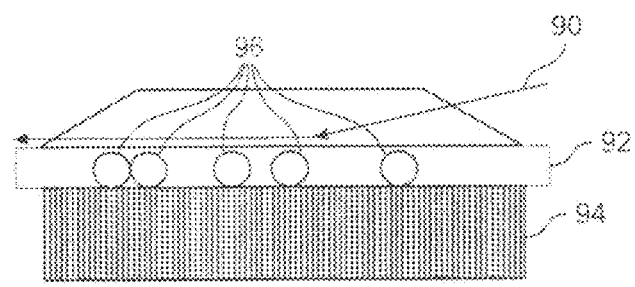
FIG. 9 is a side view of an embodiment of the dark-field microscopy imaging apparatus showing an illumination path extending from a side opposing that of a complementary metal oxide semiconductor (CMOS) sensor or charge-coupled device (CCD)

FIG. 9 shows white light 90 directed towards a wafer 92 from a top of the wafer 92 opposing that of a complementary metal oxide semiconductor (CMOS) sensor or charge-coupled device (CCD) 94 disposed at a bottom of the wafer 92. The white light 90 is directed at an angle that provides for total internal reflection, which results in an evanescent field of a few hundred nanometers from a surface of the wafer 92. Optimization of this angle is determined by the condition of total internal reflection that minimizes scattering and transmission of light out of the wafer 92, which substantially enhances the signal-to-noise ratio of the object to be imaged with respect to its background.

In this embodiment, a large imaging area of, for example, 10-1000 mm2 is provided, which depends, at least in part, on a size of the CMOS sensor or CCD 94 being used, with approximately two (2) microns of resolution or pixel size. This embodiment makes it possible to spectrally image and count a large number of nanoparticles 96 such as, but not limited to, virus-induced clusters, thereby substantially improving diagnostic accuracy and precision, while also providing for straightforward sample preparation utilizing an entire sample area. Accordingly, the embodiment illustrated in FIG. 9 is particularly suited to providing substantial benefits when conducting, large volumes of diagnostic testing in, for example, a laboratory setting.

Figure 10A:
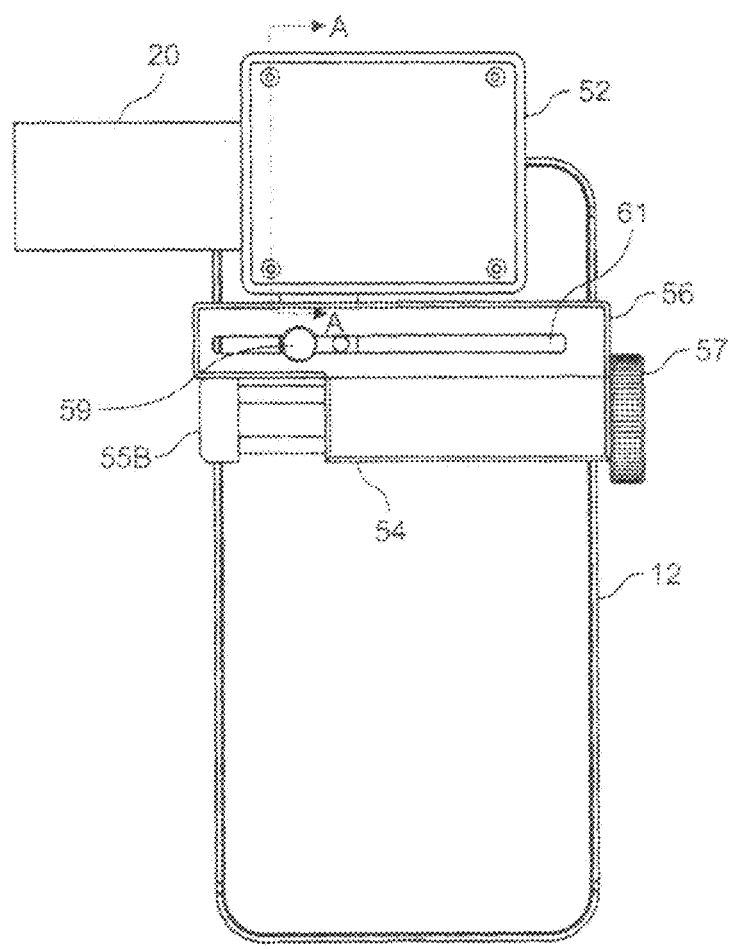
FIG. 10A is a front view of an embodiment of the dark-field microscopy imaging apparatus mounted on the smart device.
Figure 10B:
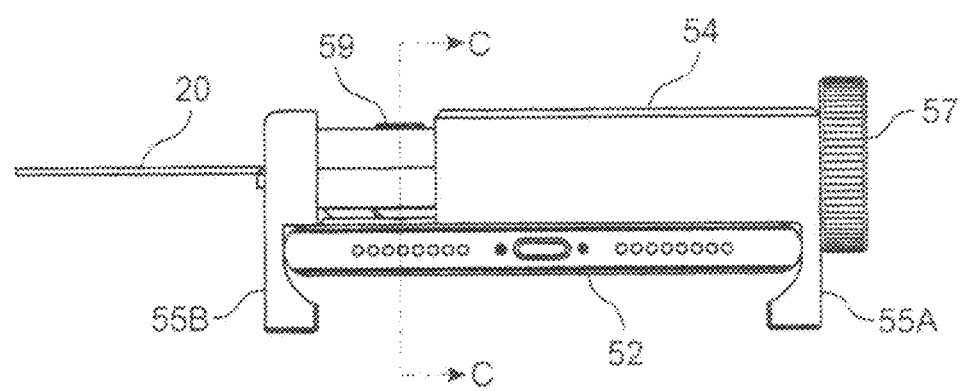
FIG. 10B is a top view of the embodiment shown in FIG. 10A.

FIGS. 10A-E show an embodiment of the dark-field microscopy imaging apparatus in greater detail. For example. FIG. 10A shows a front view of the dark-field microscopy imaging apparatus mounted on the smart device 12, which includes the wafer 20, main body 52, clamping assembly 54, arm 553, slider assembly 56, tensioning dial 57, slot 61, and slider set screw 59. Likewise, FIG. 10B shows a top view of the embodiment mounted on the smart device 12, which includes the wafer 20, main body 52, clamping assembly 54, arms 55A-B, tensioning dial 57, and slider set screw 59.

Figure 14:
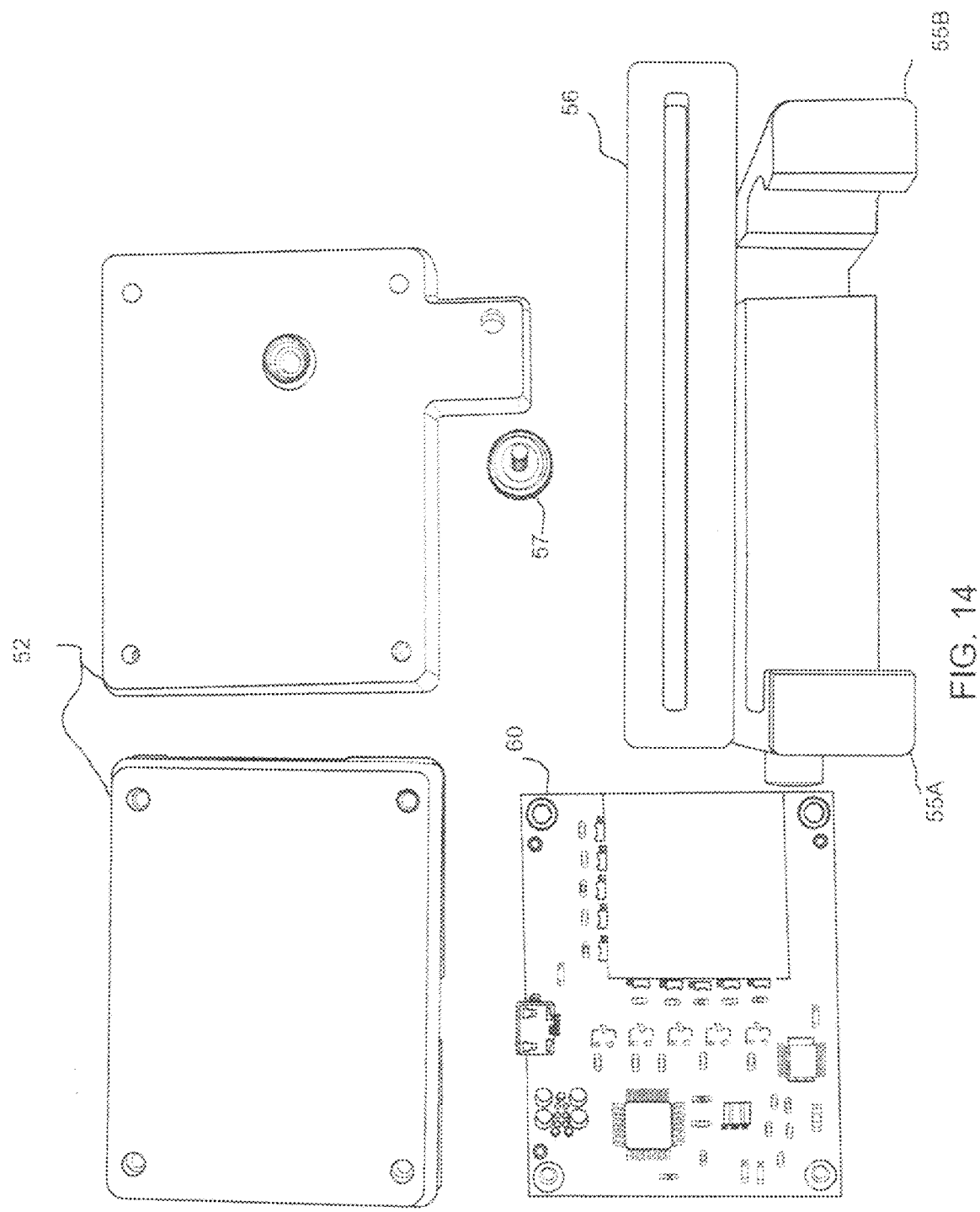
FIG. 14 shows an exploded view of an embodiment of the dark-field microscopy imaging apparatus mounted on the smart device.
Figure 15B:
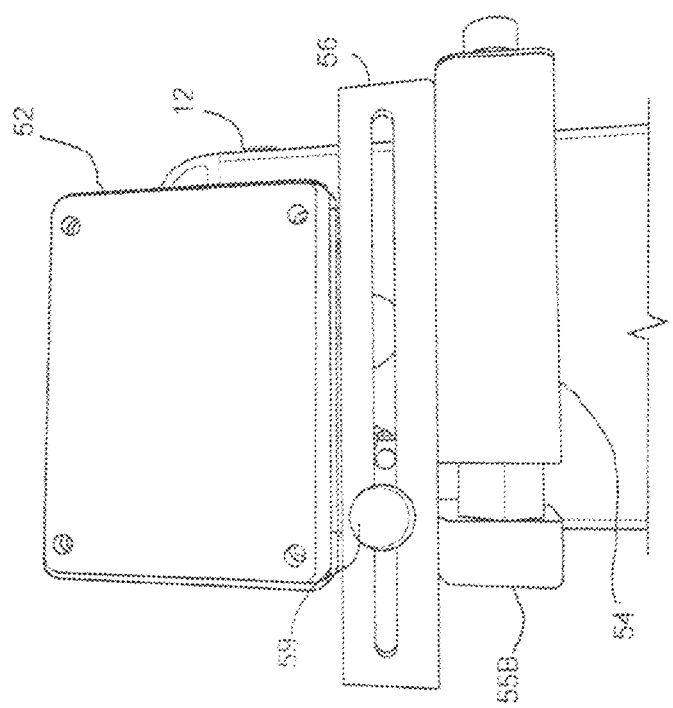
FIG. 15B shows a front view of an embodiment of the dark-field microscopy imaging apparatus mounted on the smart device shown in FIG. 14.
Figure 15A:
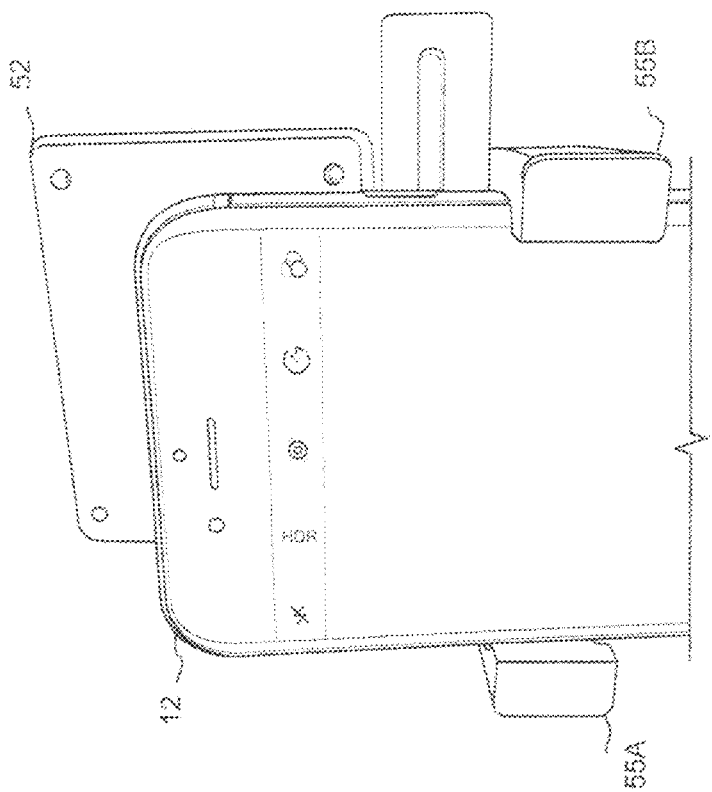
FIG. 15A shows a rear view of the embodiment of the dark-field microscopy imaging apparatus mounted on the smart device shown in FIG. 14.
Figure 16:
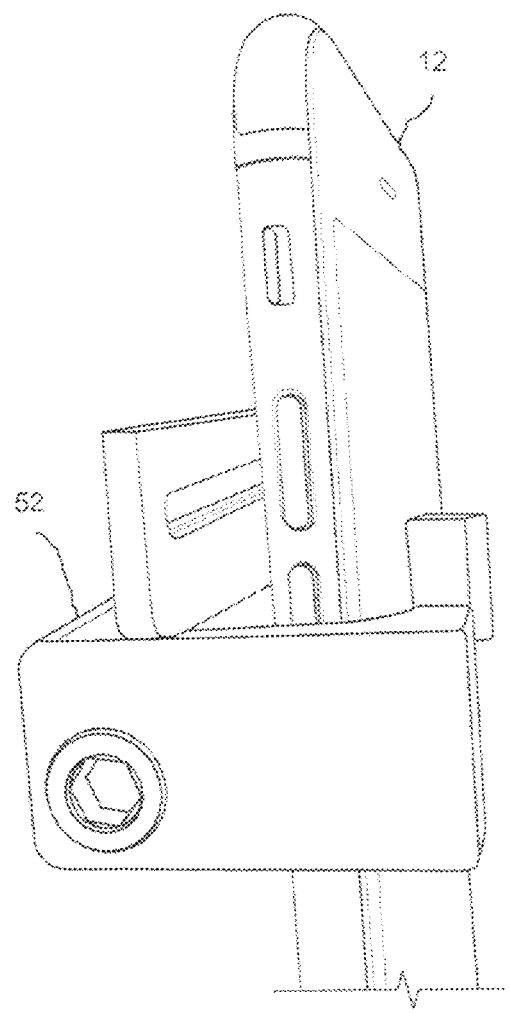
FIG. 16 shows a side view of the embodiment of the dark-field microscopy imaging apparatus mounted on the smart device shown in FIG. 14.

FIG. 10C shows a cross-sectional view of the embodiment of the dark-field microscopy imaging apparatus mounted on the smart device 12 as seen from section CC in FIG. 10B, which includes the camera 16, main body 52, clamping assembly 54, arm 55A, tensioning dial 57, slider set screw 59, circuit board 60, and slot 61. Similarly. FIG. 10D shows a cross-sectional view of the embodiment of the dark-field microscopy imaging apparatus mounted on the smart device 12 as seen from section AA in FIG. 10A, which includes the camera 16, main body 52, and circuit board 60. FIG. 10L shows a front perspective view of the embodiment of the dark-field microscopy imaging apparatus mounted on the smart device 12, which includes the wafer 20, main body 52, clamping assembly 54, arms 55A-B, slider assembly 56, tensioning dial 57, slot 61, and slider set screw 59. Similarly. FIG. 14 shows an exploded view. FIG. 15A shows a rear view, FIG. 15B shows a front view, and FIG. 16 shows a side view of the embodiment of the dark-field microscopy imaging apparatus mounted on the smart device 12.

Figure 11A:
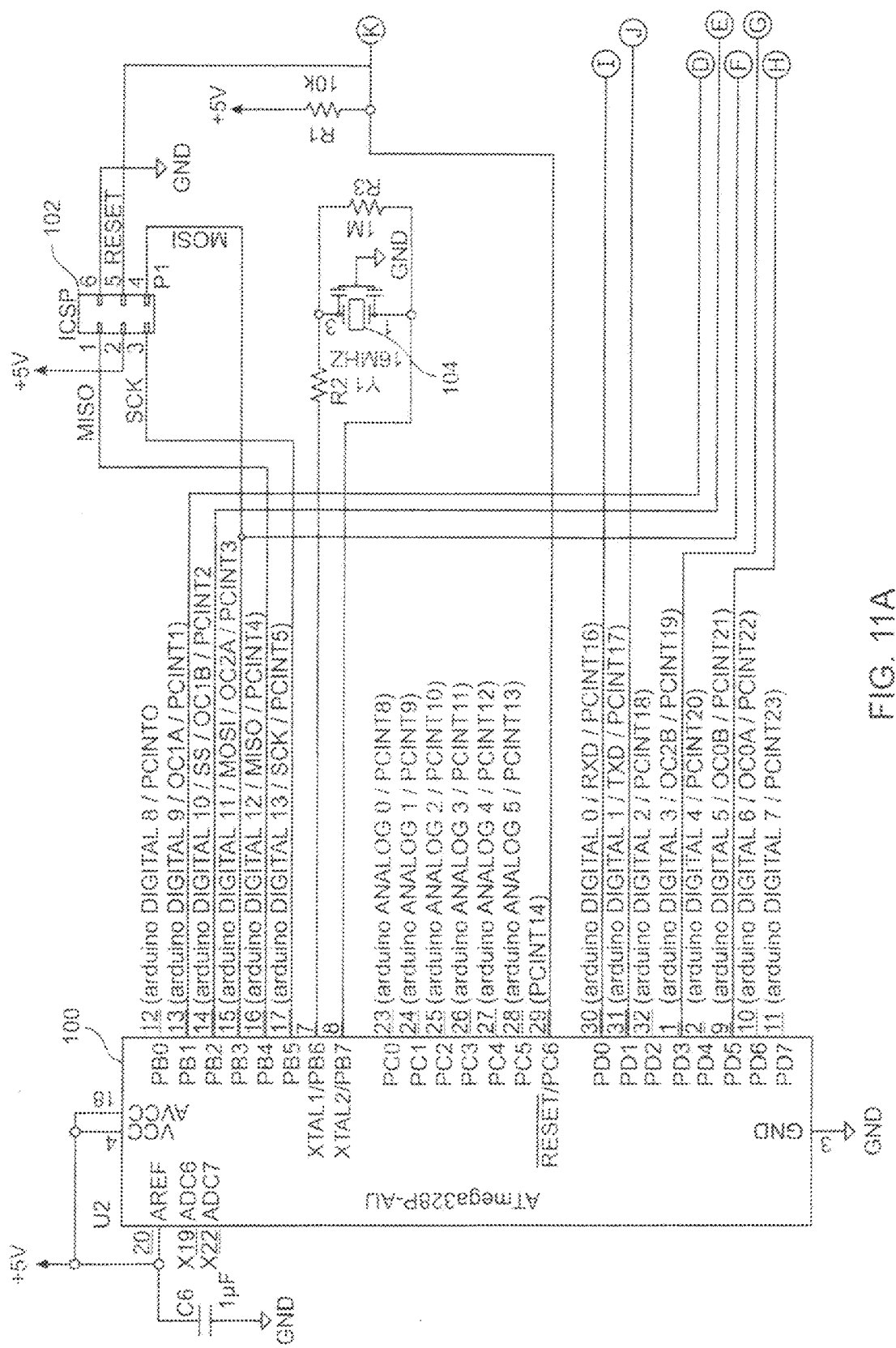
FIGS. 11A-E are schematic diagrams of a circuit implemented on the circuit board.

FIGS. 11A-E show schematic diagrams of a circuit implemented on the circuit board that controls the illumination devices or LEDs D1-11. FIG. 11A includes a microcontroller 100 (which is implemented using a commercially available microcontroller (ATMEGA328P-AU from Microchip Technology, 2355 W. Chandler Blvd., Chandler, AZ 85224, an in-circuit serial programming interface (ICSP) 102 implemented using a 6-pin header and programmed using an in-circuit emulator (which is commercially available as AVR-ISP-Mk2 from Microchip Technology Inc., 2355 West Chandler Blvd., Chandler, Arizona, 85224-6199; for firmware programming, and a commercially available 16 MHz crystal oscillator or resonator (which is commercially available from Abracon, 5101 Hidden Creek Lane, Spicewood, Texas 78669).

Figure 11B:
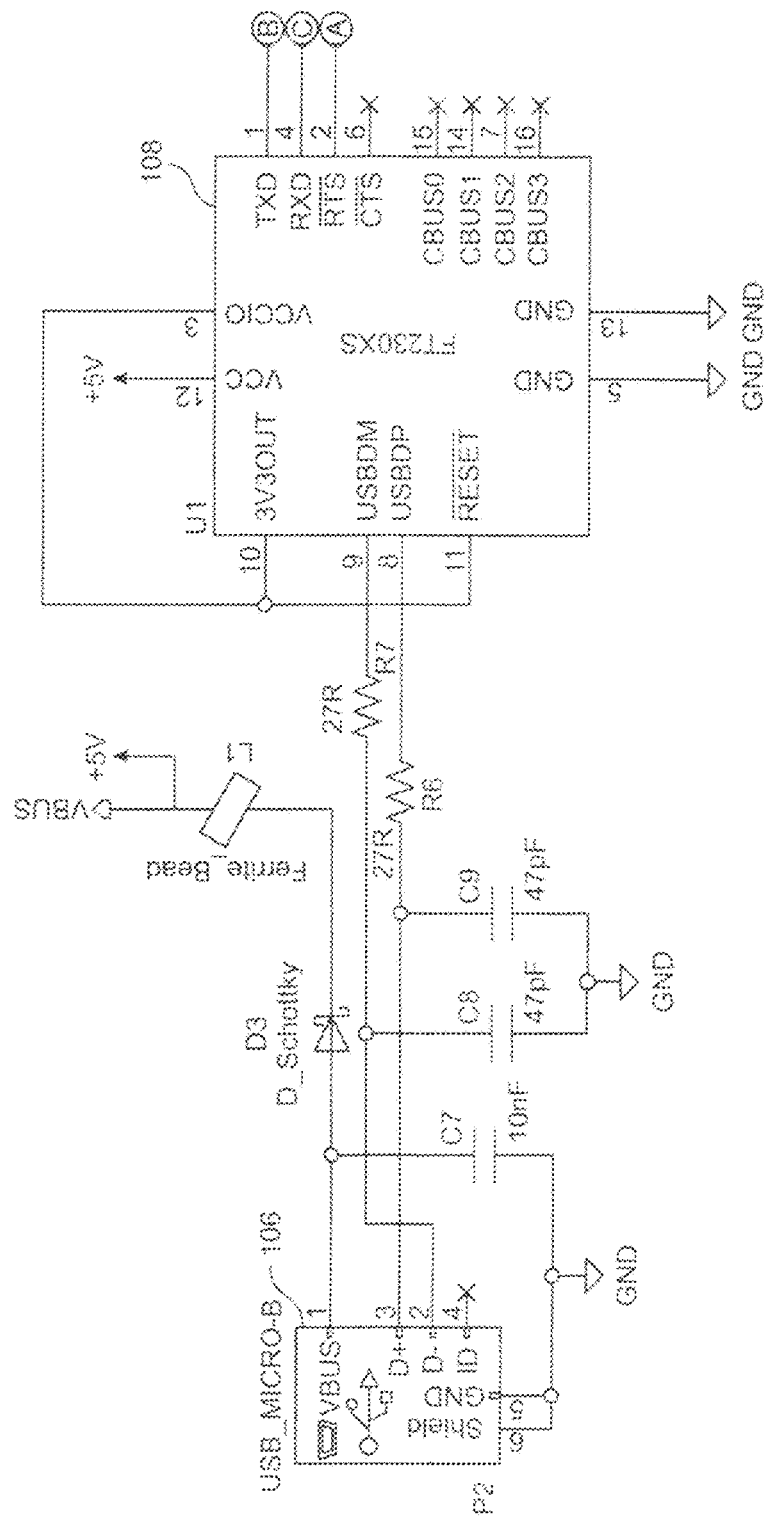
Figure 11C:
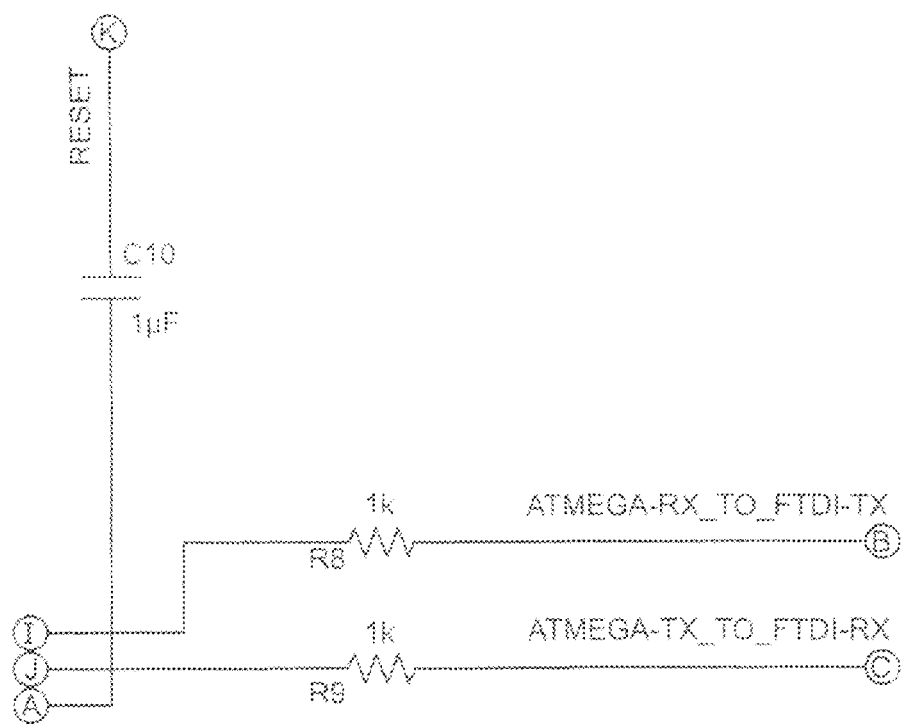

Pin 29 of the microcontroller 100 is serially connected to 5V power through a resistor R1 and provides a power-up reset to the microcontroller 100. Pins 1, 9, and 13-15 of the microcontroller 100 are used to control the LEDs shown in FIGS. 11D-E. Pins 30 and 31 of the microcontroller 100 are used to receive and transmit serial communications, respectively, external to the circuit board, and are serially connected to resistors R8 and R9, respectively, as shown in FIG. 11B. Pin 7 of the microcontroller 100 is serially connected through resistor R2 to pin 3 of crystal oscillator 104. Pin 8 of the microcontroller 100 is connected to pin 1 of crystal oscillator 104, which is serially connected through resistor R3 to pin 3 of crystal oscillator 104. Pins 15 and 16 of microcontroller 100 are connected to pins 4 and 1 of ICSP 102, respectively, and provide in-circuit serial programming data associated with the microcontroller 100. Pin 17 of the microcontroller 100 is connected to pin 3 of ICSP 102 and provides a system clock to the in-circuit programming interface.

FIG. 11B shows a USB interface connector 106 and a universal asynchronous receiver transmitter (UART) 108. Pin 1 of the USB interface connector 106 is serially connected to pins 5 and 6 of USB interface connector 106 through capacitor C7. Pin 1 of USB interface connector 106 is serially connected to 5V power through diode D3 and ferrite head L1. Pins 2 and 3 of USB interface connector 106 are serially connected to pins 9 and 8 of U ART 108 through resistors R7 and R6, respectively. Pins 2 and 3 of USB interface connector 106 are serially connected to ground through capacitors C8 and C9 camera, respectively. Pins 3, 10, and 11 of UART 108 are connected together. Pin 2 of UART 108 is serially connected to pin 29 of microcontroller 100 through capacitor C10. The USB interface connector 106 enable external control of the microcontroller 100, and thus the LEDs 62, using a SB interface cable by, for example, a smart device, external computer, and/or the like.

Figure 11D:
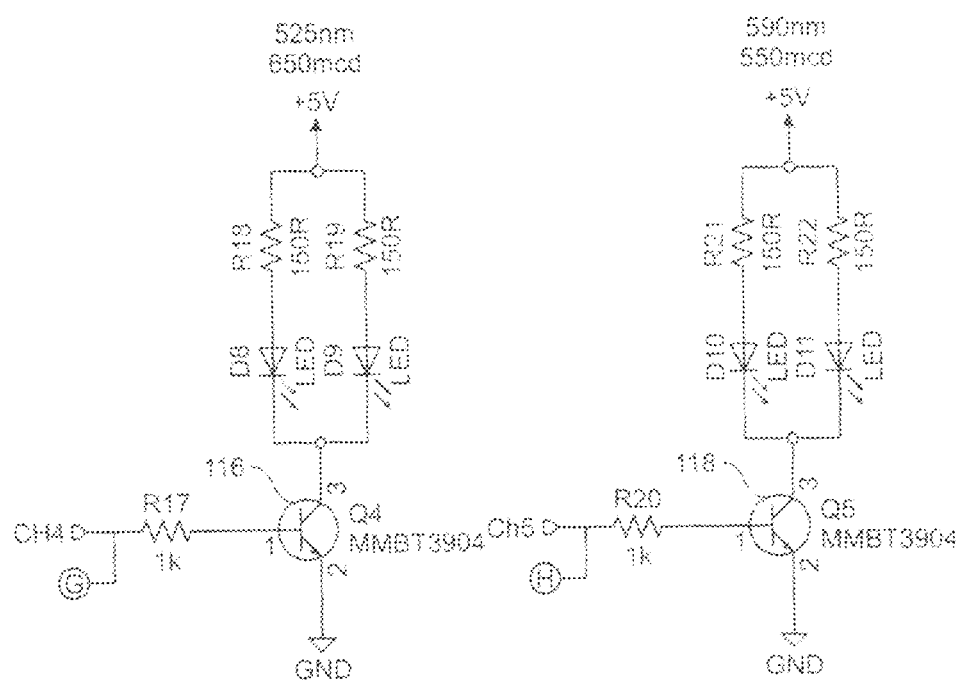
Figure 11E:
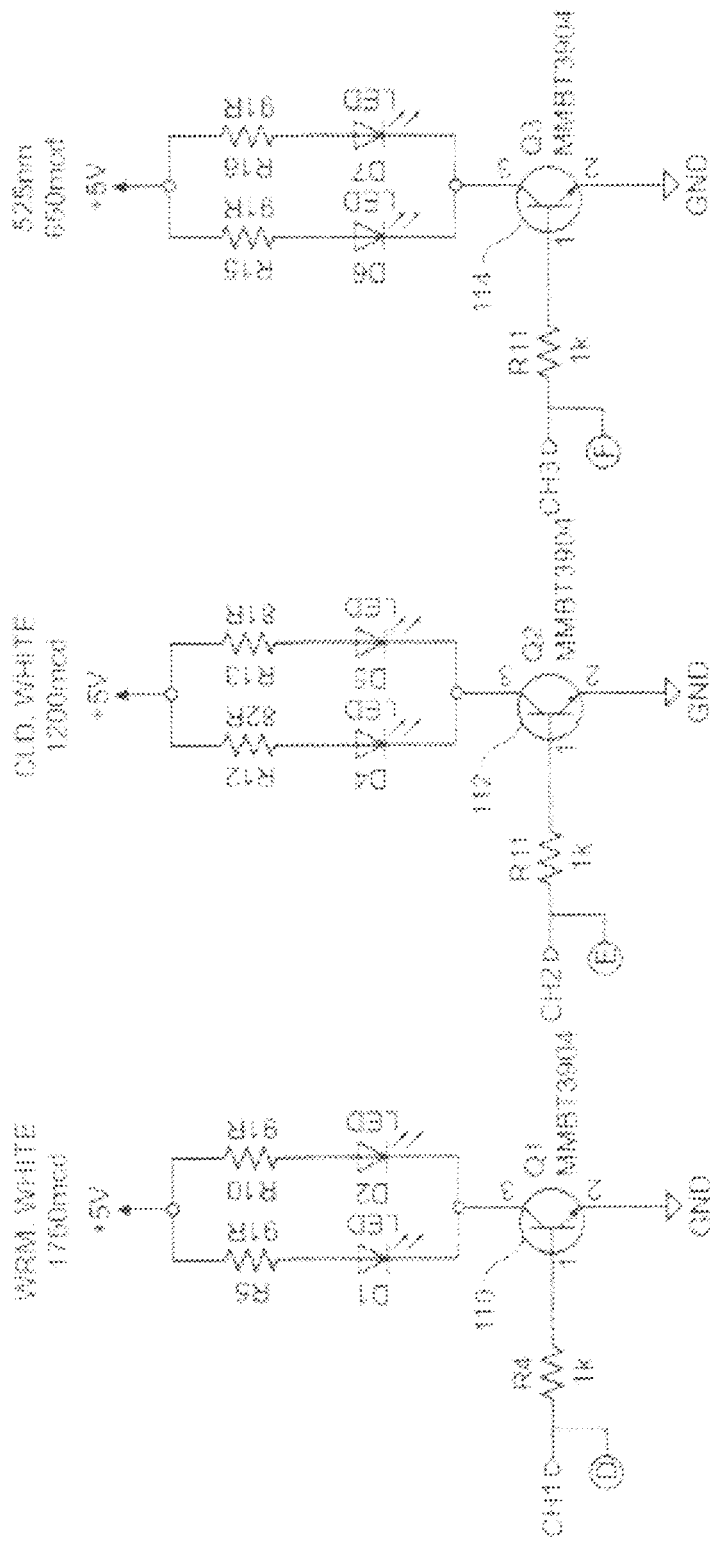

FIGS. 11D-E show the LEDs and LED driver circuits controlled by the microcontroller 100 shown in FIG. 11A. For example, pin 13 of the microcontroller 100 is serially connected to the base of transistor Q1 110, which is implemented using a commercially available NPN transistor MMBT3904 (NXP Semiconductors, 3501 Ed Bluestein Blvd., Austin. TX 78721) through resistor R4, and the emitter of transistor Q1 110 is connected to ground. The collector of transistor Q1 110 is serially connected to 5V power through (1) LED D1 and resistor R5, and (2) LED D2 and resistor R13, respectively. LEDs D1-2 emit a warm white light.

Pin 14 of the microcontroller 100 is serially connected to a base of transistor Q2 112, which is implemented using a commercially available NPN transistor (MMBT3904 which is commercially available from NXP Semiconductors, 3501 Ed Bluestein Blvd., Austin, TX 78721) through resistor R11, and an emitter of transistor Q2 112 is connected to ground. A collector of transistor Q2 112 is serially connected to 5V power through (1) LED D4 and resistor R12, and (2) LED D5 and resistor R13, respectively. LEDs D4-5 emit a cold white light.

Pin 15 of the microcontroller 100 is serially connected to a base of transistor Q3 114, which is implemented using a commercially available NPN transistor (M4MBT3904 from NXP Semiconductors, 3501 Ed Bluestein Blvd., Austin, TX 78721) through resistor R11, and an emitter of transistor Q3 114 is connected to ground. A collector of transistor Q3 114 is serially connected to 5V power through (1) LED D6 and resistor R15, and (2) LED D7 and resistor R16, respectively. LEDs D6-7 emit a green light.

Pin 1 of the microcontroller 100 is serially connected to a base of transistor Q4 116, which is implemented using a commercially available NPN transistor MM3T3904 (NXP Semiconductors, 3501 Ed Bluestein Blvd., Austin, TX 78721) through resistor R17, and the emitter of transistor Q4 116 is connected to ground. The collector of transistor Q4 116 is serially connected to 5V power through (1) LED D8 and resistor 18, and (2) LED D9 and resistor R19, respectively. LEDs D8-9 also emit a green light to achieve additional brightness at a wavelength of 525 nm.

Pin 9 of the microcontroller 100 is serially connected to the base of transistor Q5 118, which is implemented using a commercially available NPN transistor (MMBT3904 from NXP Semiconductors, 3501 Ed Bluestein Blvd., Austin, TX 78721) through resistor R20, and the emitter of transistor Q, 118 is connected to ground. The collector of transistor Q5 118 is serially connected to 5V power through (1) LED D10 and resistor R21, and (2) LED D11 and resistor R22, respectively. LEDs D1-2 provide a yellow light. In this embodiment. LEDs D6-9 emit substantially the same color of light. As shown in FIG. 7, there are two rows of LEDs 62, one row is horizontal and the other row is vertical. In each row, there are six (6) LEDs 62. Each LED of a pair of LEDs 62 having substantially similar spectral characteristics is disposed in either the horizontal row or vertical row. The complimentary pairs of LEDs having the same color illuminate different edges or sides of the wafer. Thus, if three or four sides of the wafer are illuminated, then a corresponding quantity of LEDs (i.e., three or four, respectively) would be driven by each transistor Q1-5. For example, as shown in FIG. 11E, LED D6 is disposed in the horizontal row and LED D7 is disposed in the vertical row. However. LEDs D6, D7 are activated by the same microcontroller output CH3, and thus operate simultaneously to achieve uniform illumination.

As indicated above in reference to FIGS. 11A-E, the microcontroller 100 controls operational characteristics of the LEDs D1-11 such as, but not limited to, intensity, sequential activation, simultaneous activation, and course-focusing of the optical lens using an application on the phone, and/or the like in accordance with software, programs, and/or applications executed on and/or accessed by the circuit board to enhance spectral resolution of the subject sample. Artificial intelligence and/or image recognition technology can also be implemented using, for example, applications made available on the smart device 12.

The microcontroller 100 may further be configured for control from external apparatus by using, for example the UART 108, which enables wired serial communication between the external apparatus and microcontroller 100. In addition, the microcontroller 100 may be configured for control from the smart device 12 by using, for example, a wireless transceiver (not shown) disposed on the circuit board operatively coupled to the microcontroller 100, which enables wireless communication between the smart device 12 and microcontroller 100 using technology such as, but not limited to. Bluetooth, Wi-Fi, and/or the like. The operational characteristics of the LEDs D1-11 may also be controlled manually using one or more input devices disposed on, for example, the main body such as, but not limited to, a dial, button, slide, and/or the like.

Figure 12A:
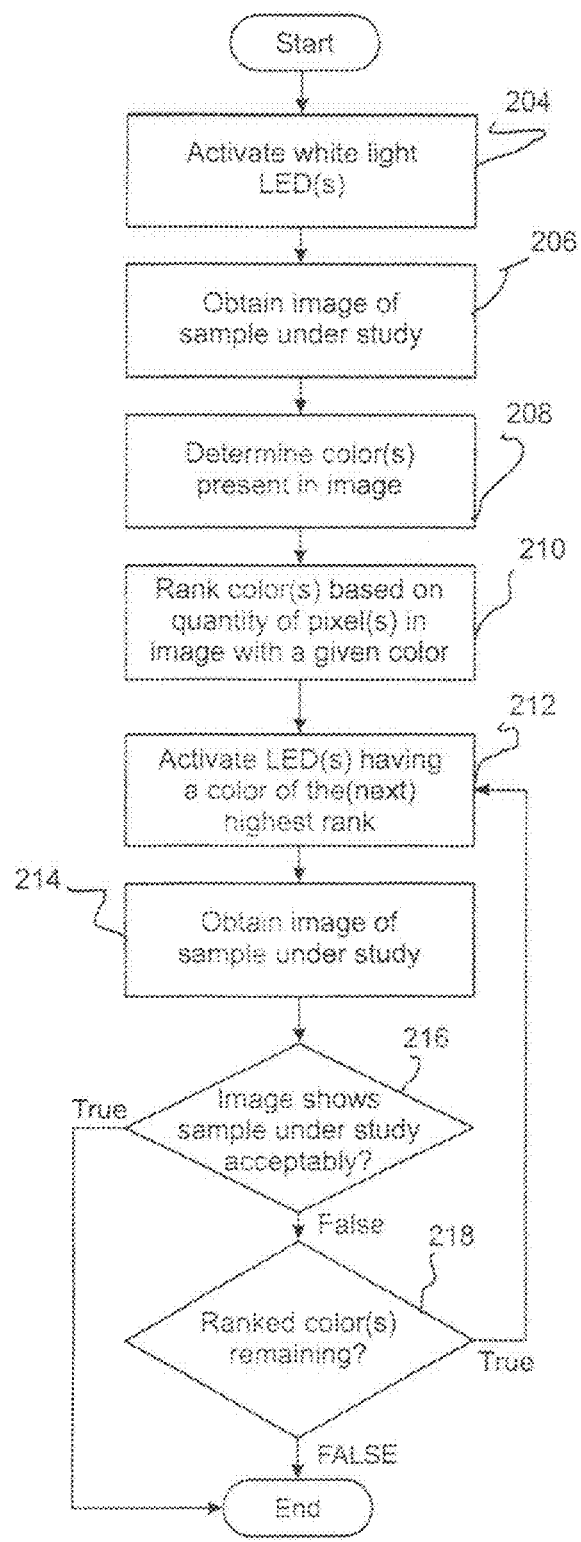
FIGS. 12A-B are flowcharts showing embodiments of an algorithm flor sequential activation of the LEDs D1-11.
Figure 12B:
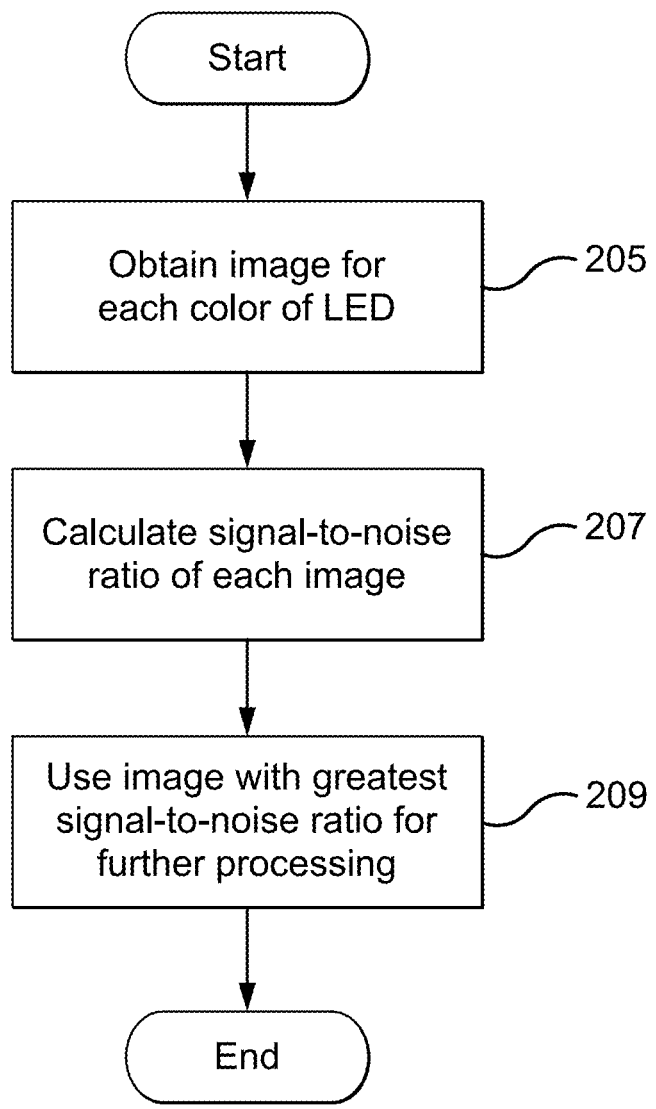

Embodiments of an algorithm for sequential activation of the LEDs D1-11 are shown in FIGS. 12A-B. In FIG. 12A, a broad spectrum white light is illuminated or activated in step 204, and an image of the sample under study is obtained in step 206. Colors present in the image are obtained in step 208, and these colors are ranked in terms of a quantity of pixels in the image with a given color in step 210. Those LED(s) emitting the color having the highest rank are illuminated in step 212, and another image of the sample under study is obtained using the illuminated LED(s) in step 214. If the image shows the sample under study acceptably in step 216, the process uses the image obtained. However, if the image does not show the sample under study acceptably in step 216, the process determines if there are any ranked colors that were not tried in step 218. If so, the process returns to activate LED(s) emitting the color of the next highest rank in step 212 and proceeds as described above. If not, the process ends. The acceptability of an image may, for example, be determined based on a signal-to-noise ratio of the object under study with respect to its background.

In FIG. 12B, separate images of the object under study are obtained using LED(s) emitting one of a plurality of different colors. For each of the separate images, only those LED(s) emitting the same color are illuminated in step 205 to obtain any particular image. A signal-to-noise ratio is calculated for each image in step 207, and the image having the greatest signal-to-noise ratio is used for further processing in step 209.

With reference to FIG. 7, in one or more embodiments, a blocking structure, baffling structure, prism, lens, mirror, and/or light guide is disposed in proximity to the LEDs D1-11, on a side of the wafer 20 opposing that of the LEDs D1-11, and/or between the LEDs D1-11 and the side of the wafer 20 to direct and/or restrict illumination from the LEDs D1-11, as well as ambient light, to the side of the wafer 20. These components and/or structures may be statically positioned, manually controlled, and/or automatically controlled using applications executed by the microcontroller and/or smart device using, for example, artificial intelligence and/or image recognition technology.

Positioning and/or directionality of the blocking structure, baffling structure, prism, lens, mirror, and/or light guide is controllable with an external apparatus by using, for example the UART 108, which enables wired serial communication between the external apparatus and the microcontroller 100. The microcontroller 100 is then used to control positioning and/or directionality of the blocking structure, baffling structure, prism, lens, mirror, and/or light guide. The microcontroller 100 may also be configured for control by the smart device 12 by using, for example, a wireless transceiver (not shown) disposed on the circuit board that is operatively coupled to the microcontroller 100, which enables wireless communication between the smart device 12 and the microcontroller 100 using wireless technology such as, but not limited to Bluetooth, Wi-Fi, and/or the like. The microcontroller 100 may also then be used to control positioning and/or directionality of the blocking structure, baffling structure, prism, lens, mirror, and/or light guide. Positioning and/or directionality of the blocking structure, baffling structure, prism, lens, mirror, and/or light guide, may also be controlled manually using one or more input devices disposed on the main body such as, but not limited to, a dial, button, slide, and the like.

Figure 13:
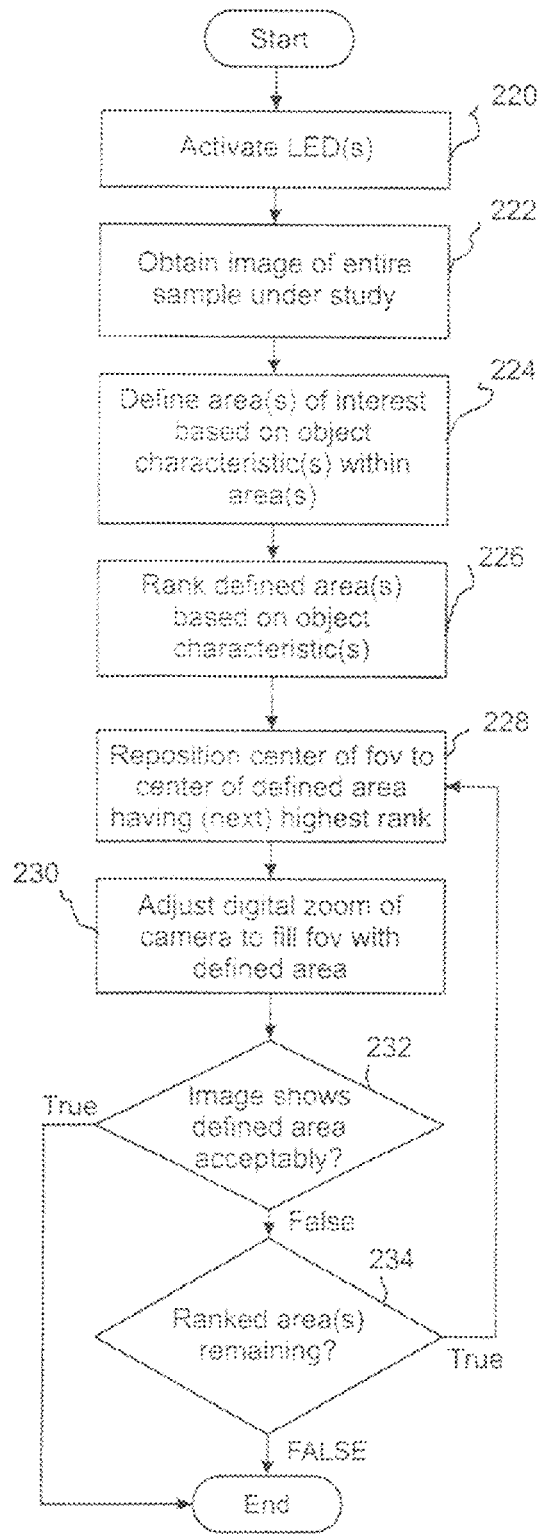
FIG. 13 is a flowchart of an embodiment of an auto-scanning algorithm that locates features of interest based on object characteristics.

FIG. 13 shows an embodiment of an auto-scanning algorithm used to locate features of interest based on spectral characteristics such as, but not limited to, object density, size, shape, and/or the like in a sample under study and automatically direct the user's current field-of-view to those features. One or more LED(s) are illuminated in step 220, and an image of the entire sample under study is obtained in step 222. One or more areas of interest are defined based on object characteristics within these areas in step 224, and the defined areas are ranked based on the object characteristics in step 226. A center of the field-of-view (fov) is repositioned to be the center of the defined area having the greatest ranking in step 228, and a digital zoom associated with the smart device is adjusted to fill the fov with this defined area in step 230. If the image shows the defined area acceptably in step 232, the process ends. If not, the process determines if there is another ranked area in step 234. If so, the process returns to step 228 and repositions the center of the fov to the center of the defined area having, the next highest rank, and continues with the process as described above. If no further ranked area remains as determined in step 234, the process ends.

Repositioning the center of the field-of-view is controllable with an external apparatus by using, for example, the UART 108, which enables wired serial communication between the external apparatus and microcontroller 100. The microcontroller 100 is then used to control positioning of the main body and wafer with respect to the smart device and camera by automatically controlling, for example, the clamping assembly 54 and/or sliding assembly 56. The microcontroller 100 may also be configured for control from the smart device 12 by using, for example, a wireless transceiver (not shown) disposed on the circuit board that is operatively coupled to the microcontroller 100, which enables wireless communication between the smart device 12 and microcontroller 100 using wireless technology such as, but not limited to, Bluetooth. WiFi. and/or the like technology. The microcontroller 100 is then also used to control positioning of the main body and wafer with respect to the smart device and camera by automatically controlling, for example the clamping assembly 54 and/or sliding assembly 56. Positioning of the main body and wafer with respect to the smart device and camera may also be controlled manually using one or more input devices disposed on the main body such as, but not limited to, a dial, button, slide, and/or the like.

In addition to the two-dimensional adjustability afforded by the clamping assembly 54 and sliding assembly 56 shown in FIGS. 5, 6, and 10A-E, in one or more embodiments, adjustability is also provided in, for example, a z-direction with respect to a distance between the camera associated with the smart device and the positive lens associated with the main body. Positioning in the z-direction can also be fixed for simplicity of design and operation. Z-direction adjustability may be implemented using, for example, a second sliding assembly (not shown) disposed on one or more of the arms 55A-B, which can be fixed at distinct positions in the z-direction along a second slot (not shown) using a second slider set screw (not shown).

Adjustability in the z-direction may be configured manually or with an external apparatus by using, for example the UART 108, which enables wired serial communication between the external apparatus and microcontroller 100. The microcontroller 100 is then used to automatically control adjustment of the distance between the positive lens associated with the main body and the wafer using a focus actuator associated with the positive lens, for example. The microcontroller 100 may also be configured for control by the smart device 12 by using, for example, a wireless transceiver (not shown) disposed on the circuit board operatively coupled to the microcontroller 100, which enables wireless communication between the smart device 12 and microcontroller 100 using wireless technology such as, but not limited to, Bluetooth, WiFi, and/or the like. The microcontroller 100 is then also used to control adjustment of the distance between the camera associated with the smart device and the positive lens associated with the main body in order to accommodate dimensional differences between smart devices. Adjustment of the distance between the camera associated with the smart device and the positive lens associated with the main body may be controlled manually using one or more input devices disposed on the main body such as, but not limited to, a dial, button, slide, and/or the like.

Figure 17B:
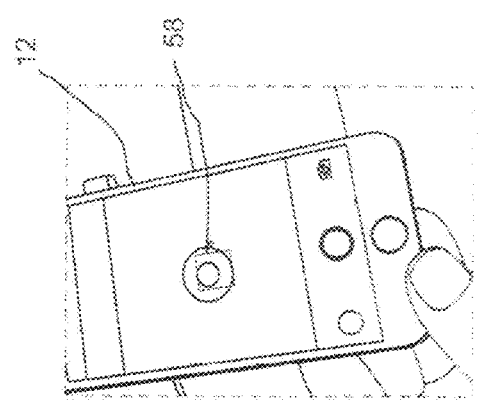
FIGS. 17A-D illustrate operation of an embodiment of the dark-field microscopy imaging apparatus mounted on the smart device.
Figure 17C:
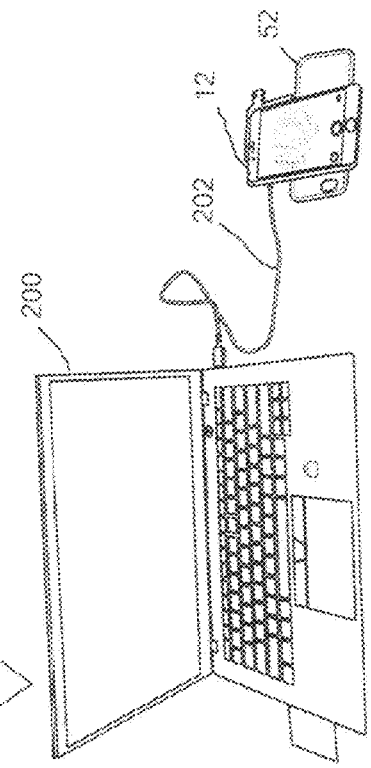
Figure 17A:
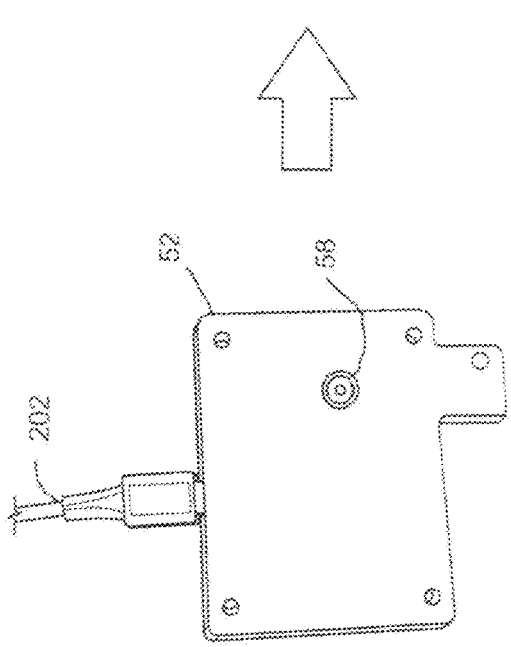
Figure 17D:
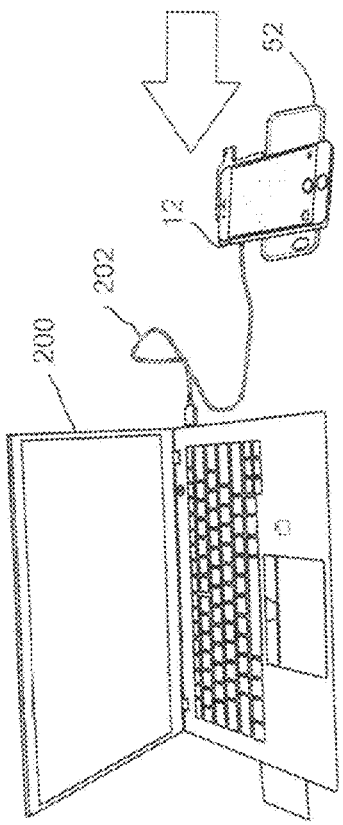

FIGS. 17A-D illustrate operation of an embodiment of the dark-field microscopy imaging apparatus mounted on the smart device 12. In FIG. 17A, the enclosure 52 is operatively coupled to a computer 200 using, for example, a USB-based connector 202. The camera of the smart device 12 is then disposed in alignment over the optical lens 58 of the enclosure 52 in FIG. 17B. The USB-based connector 202 is then plugged into the computer 200 as shown in FIG. 17C, and the computer 200 is used to capture, process, and/or display images and processing results to the user in FIG. 17I).

Figure 19A:
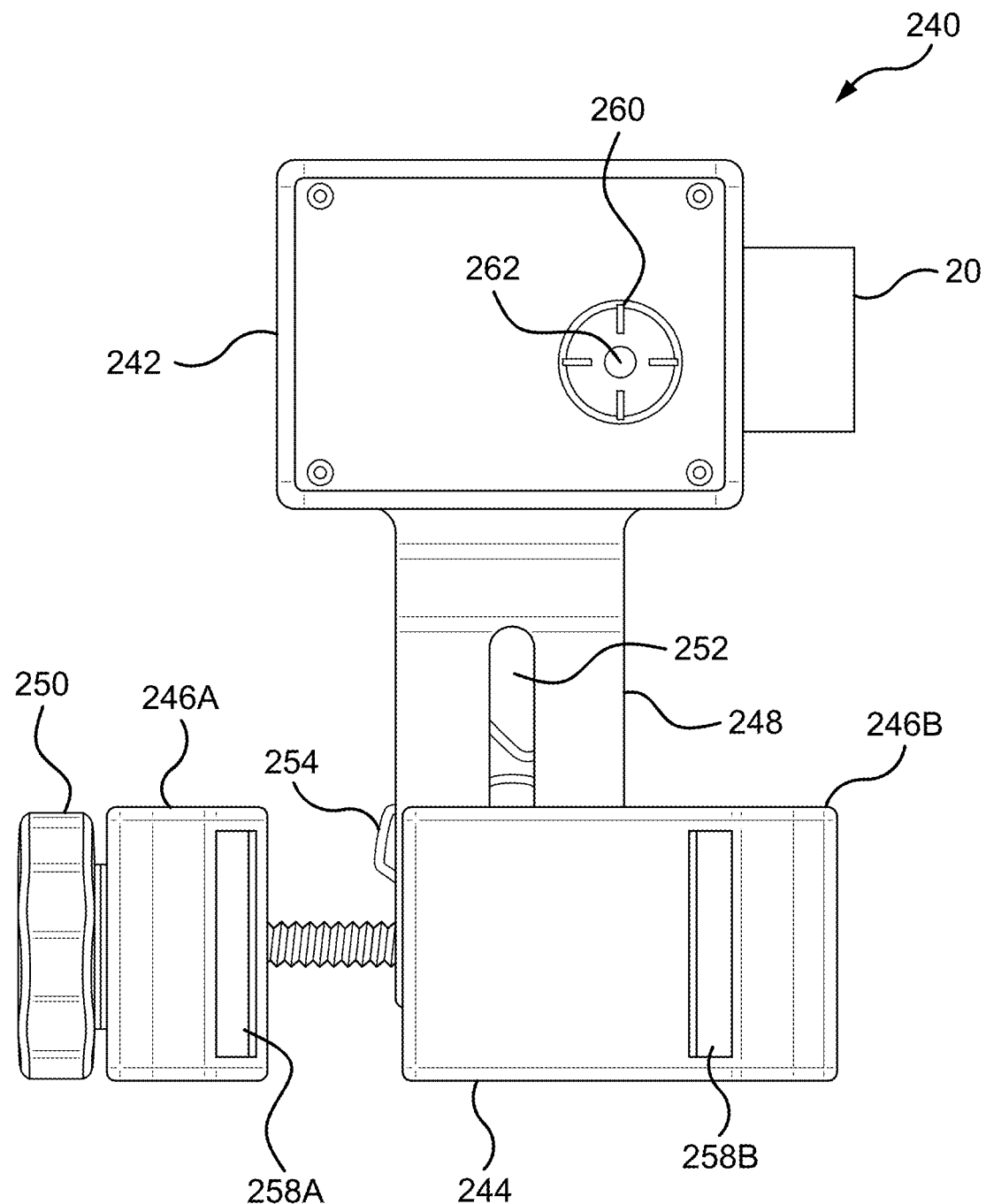
FIGS. 19A and I show rear views of an embodiment of an embodiment of the dark-field microscopy imaging apparatus.
Figure 19B:
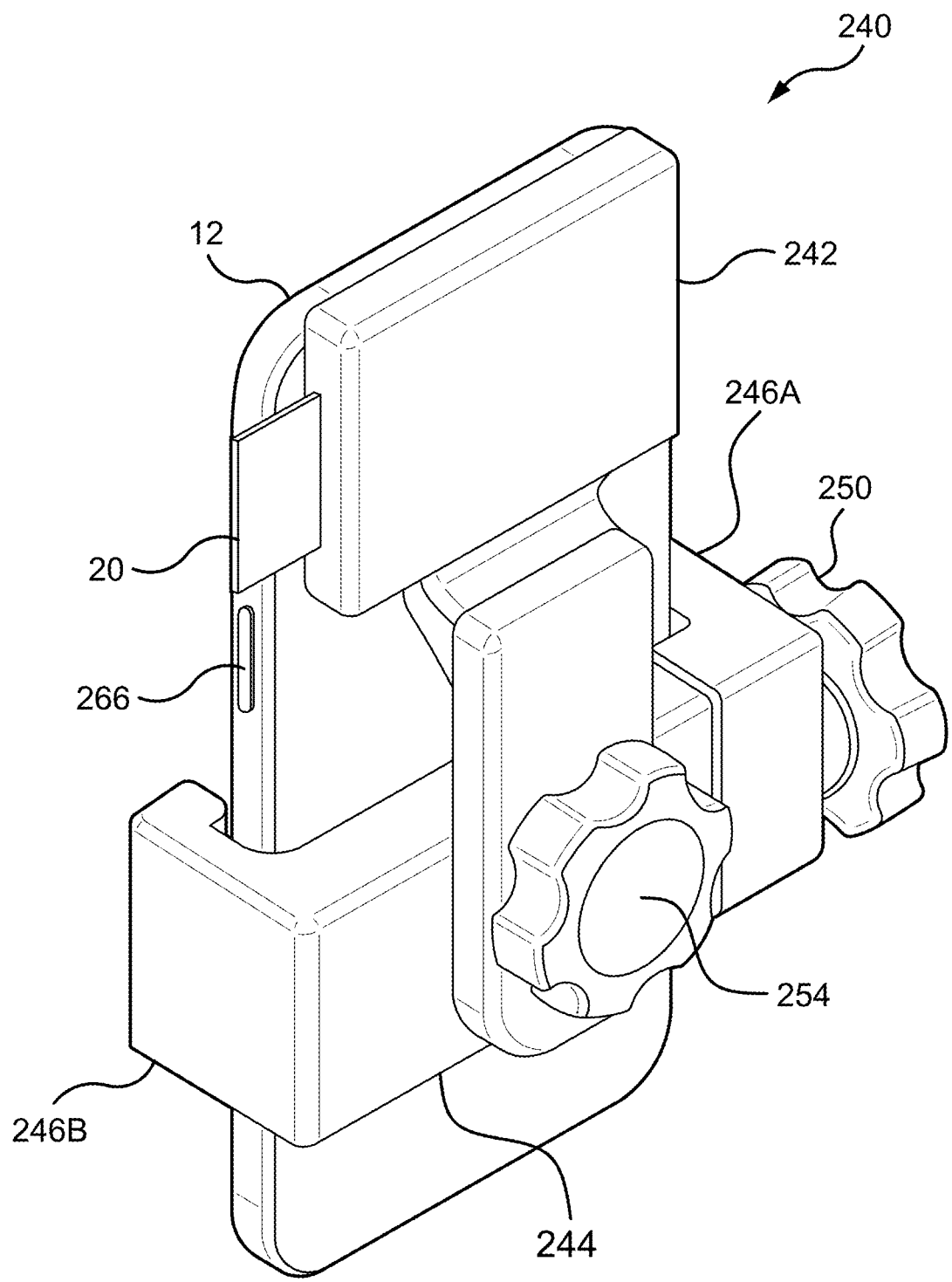
FIGS. 19B and C show front perspective views of the embodiment of the dark-field microscopy imaging apparatus shown in FIG. 19A.
Figure 19C:
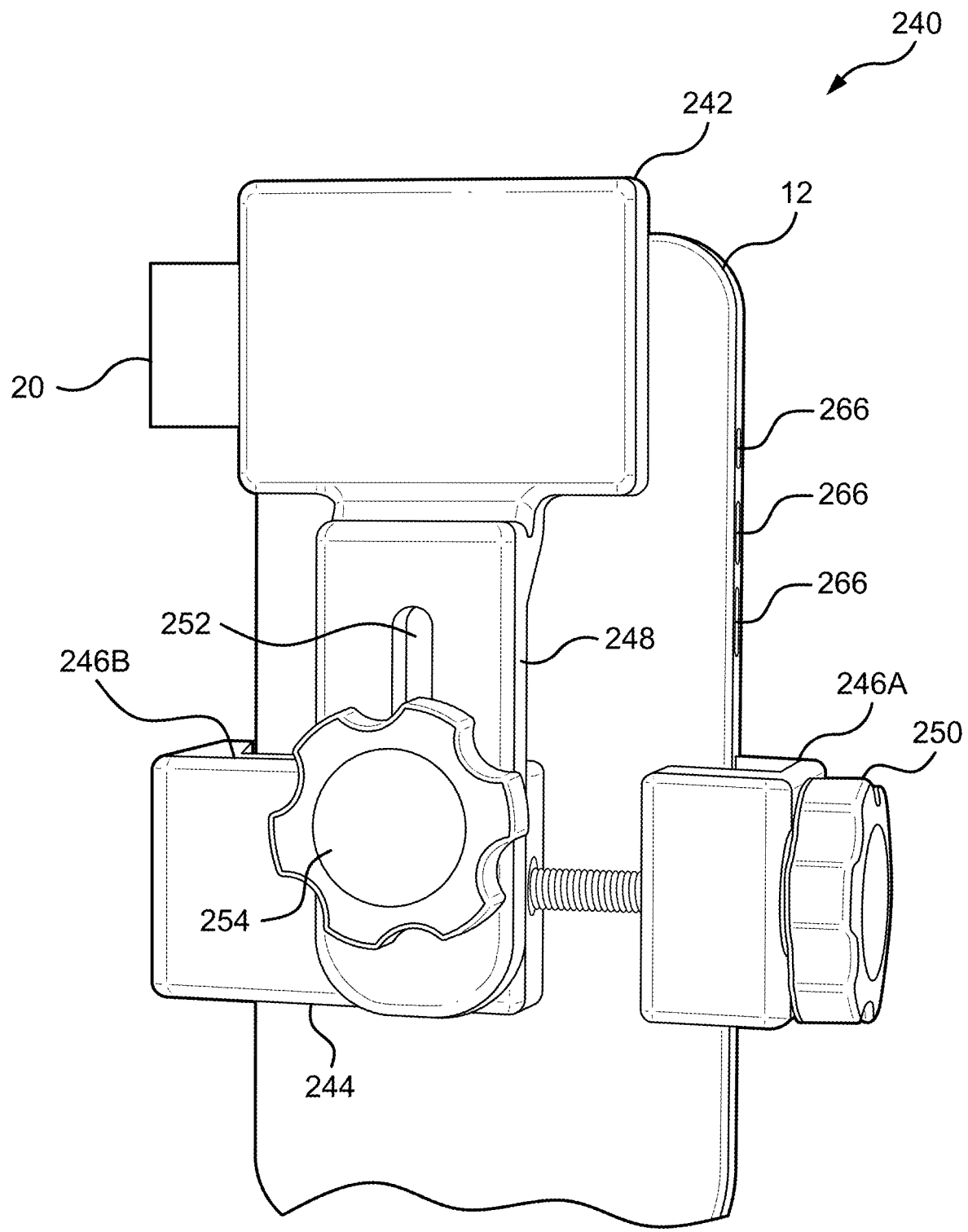
FIG. 19D shows a partial front view of the embodiment of the dark-field microscopy imaging apparatus shown in FIG. 19A.
FIGS. 19E and H show side views of the embodiment of the dark-field microscopy imaging apparatus shown in FIG. 19A.
FIGS. 19F and G show partial rear views of the embodiment of the dark-field microscopy imaging apparatus shown in FIG. 10A.
Figure 19D:
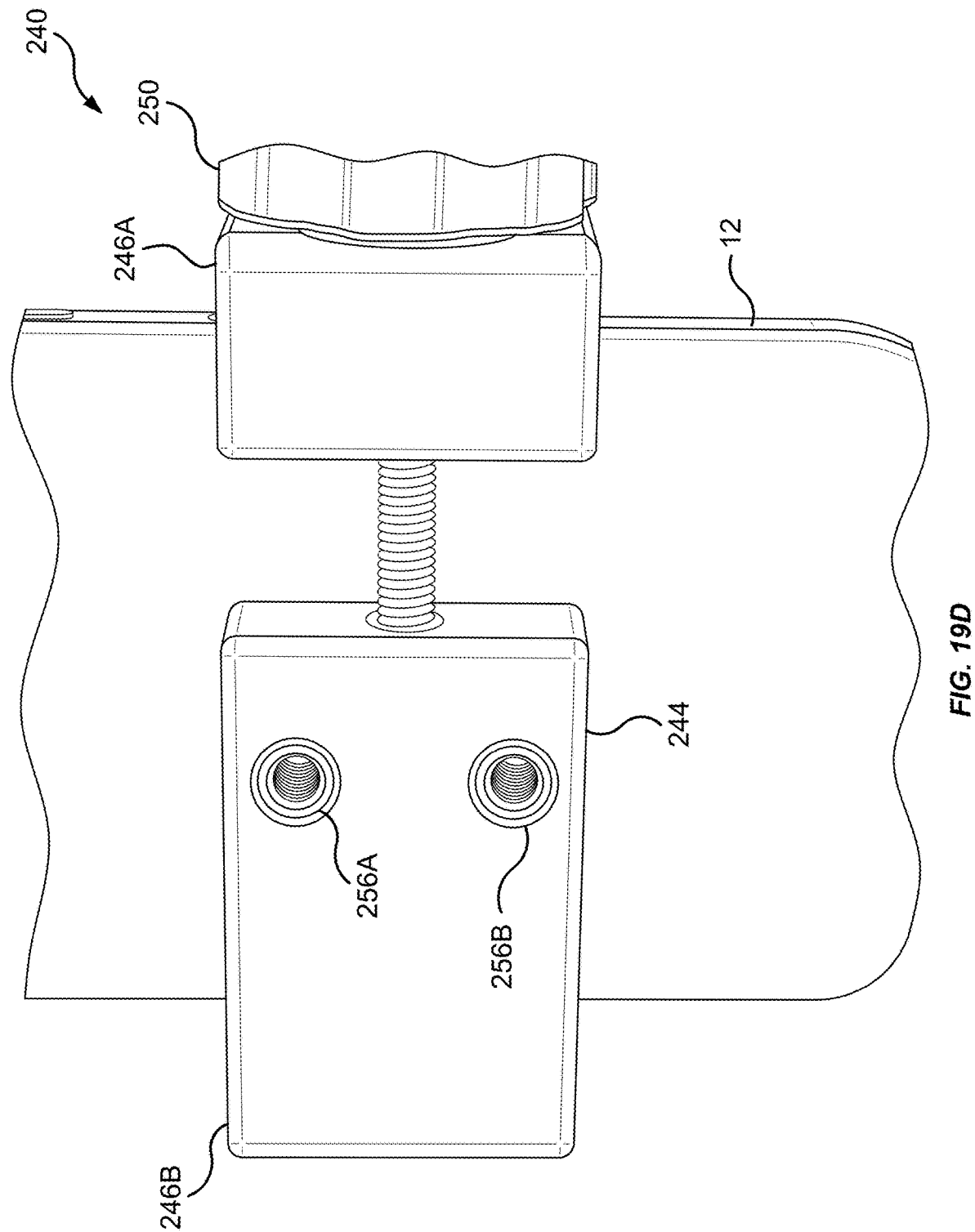
Figure 19E:
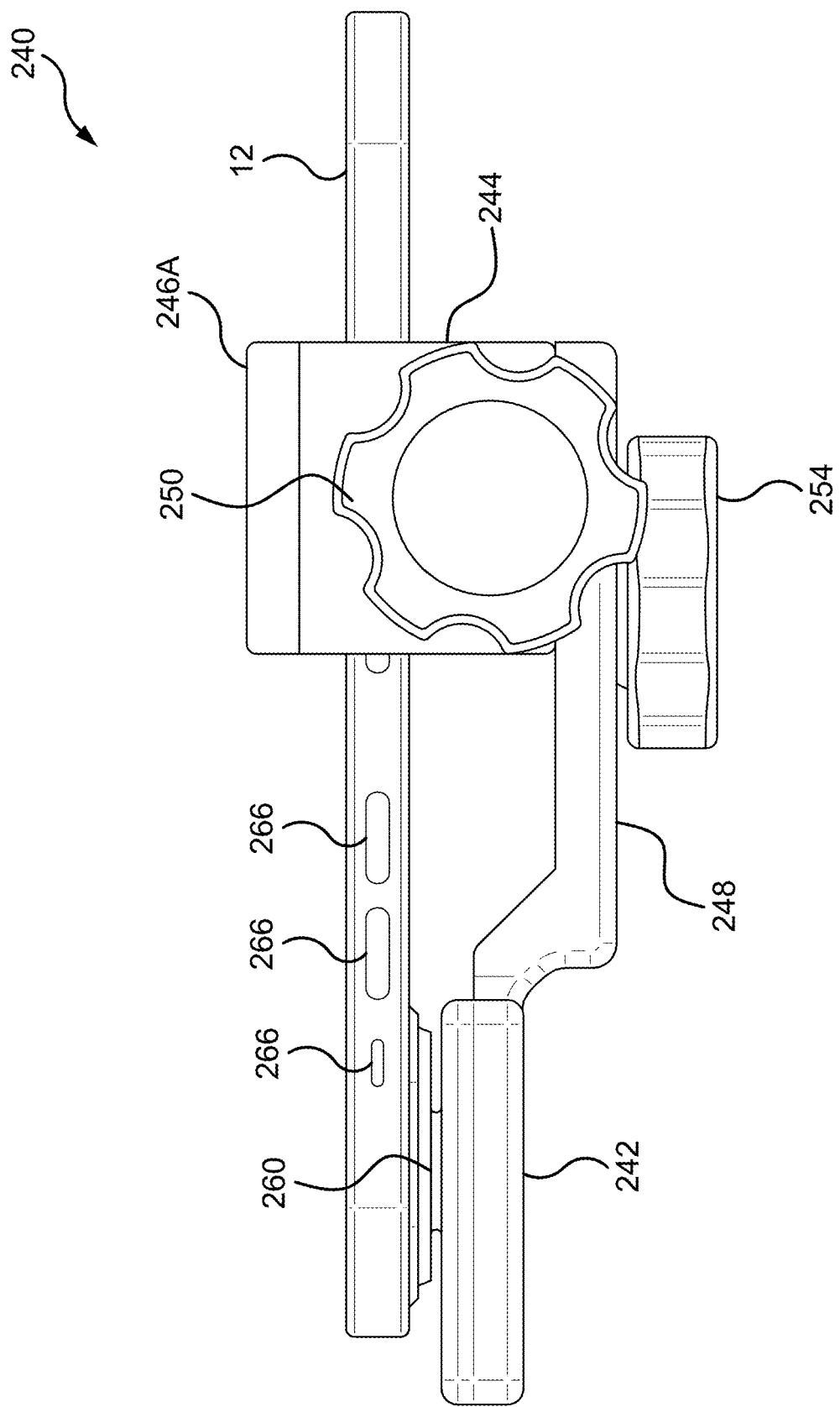

FIGS. 19A-1 illustrate another embodiment 240 of the dark-field microscopy imaging apparatus. Specifically. FIGS. 19A and I provide rear views of the dark-field microscopy imaging apparatus without the smart device attached thereto. FIGS. 19B-C provide front perspective views of the dark-field microscopy imaging apparatus mounted on the smart device 12, which show the wafer 20, man body 242, clamping assembly 244, arms 246A-B, slider assembly 248, tensioning dial 250, slot 252, and slider set screw 254. Likewise, FIGS. 19E and H provide full and partial side views, respectively, of the embodiment 240 mounted on the smart device 12, which show the wafer 20, main body 242, clamping assembly 244, arms 246A-B, slider assembly 248, tensioning dial 250, and slider set screw 254.

Figure 19F:
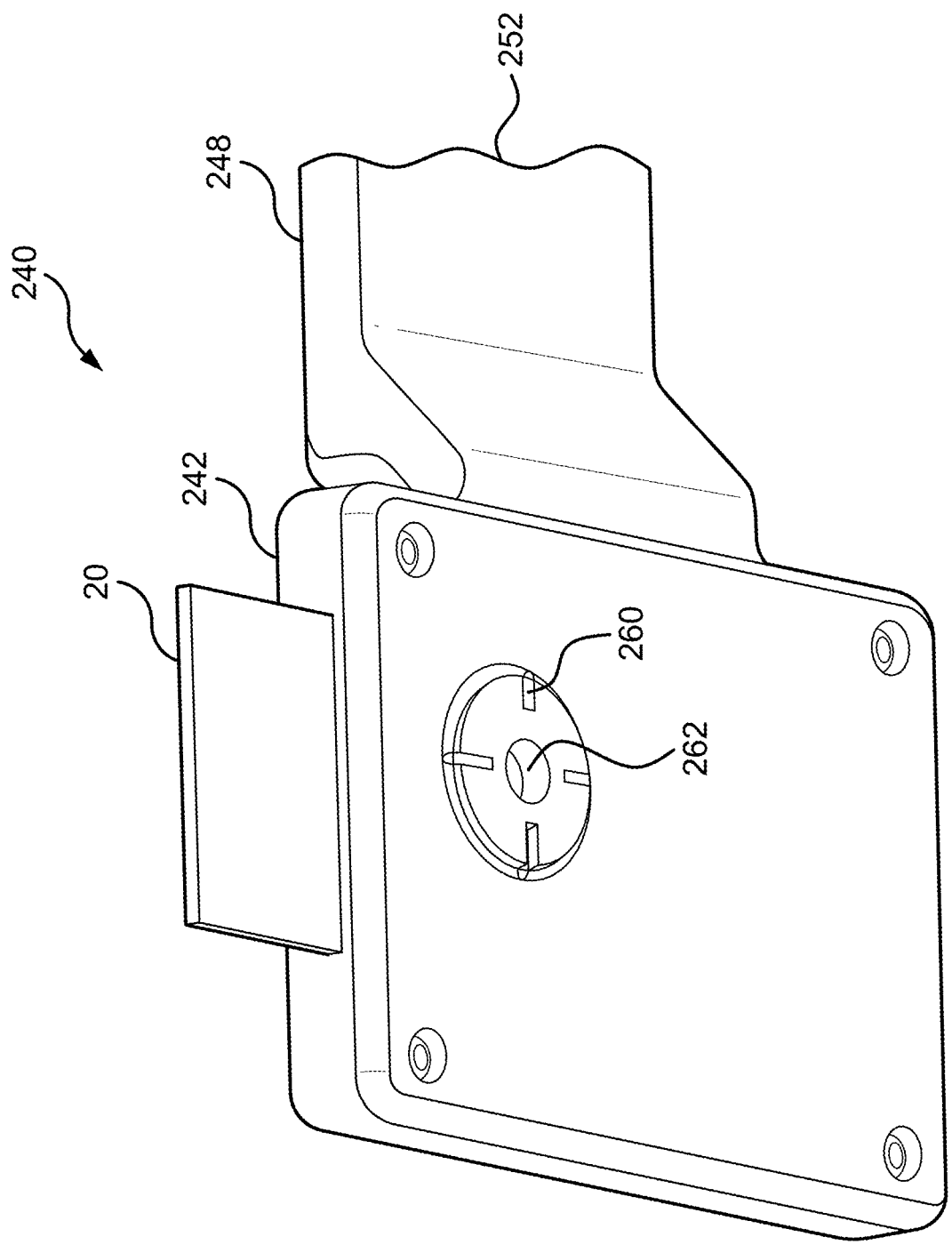

In this embodiment 240, foam may be affixed as patches 258A-B to those portions of the arms 246A-B that come in contact with the smart device 12, as shown in FIGS. 19A and I, to substantially enhance retention of the smart device 12 by the arms 246A-14 without excessive pressure or damage to the smart device 12. In addition, notches and/or raised portions 260 are provided in, for example, a crosshair configuration around the lens 262, as shown in FIGS. 19F, G, and I. These notches are readily seen in the side views provided in FIGS. 19E and H, and thus can be used effectively in guiding the lens 262 into alignment over the camera associated with the smart device 12. This alignment process is further aided by an ability of the slider assembly 248 to be rotated or pivoted in an arc centered about the slider set screw 254 in order to align the lens more efficiently 262 in a position directly over the camera associated with the smart device 12.

Figure 19G:
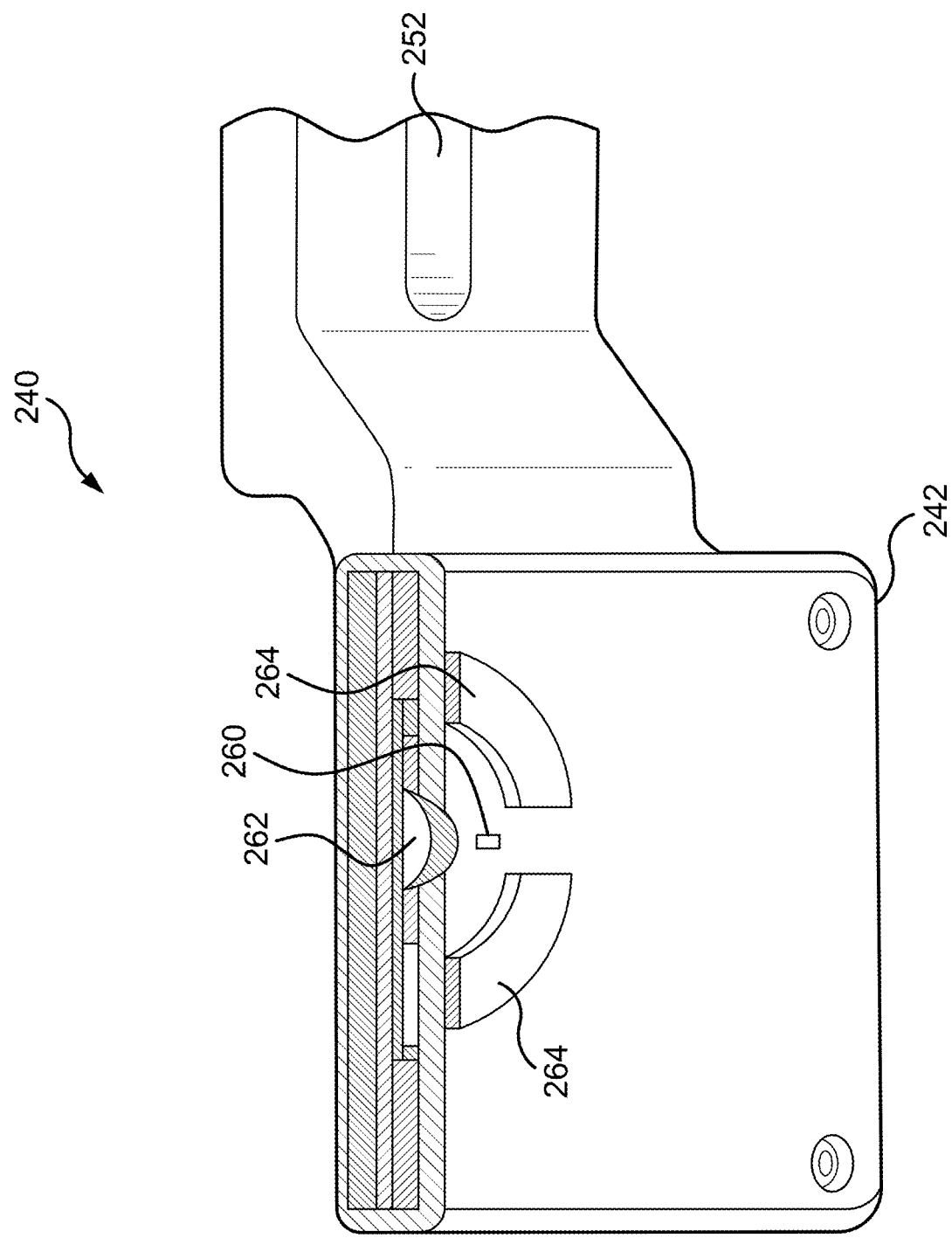
Figure 19H:
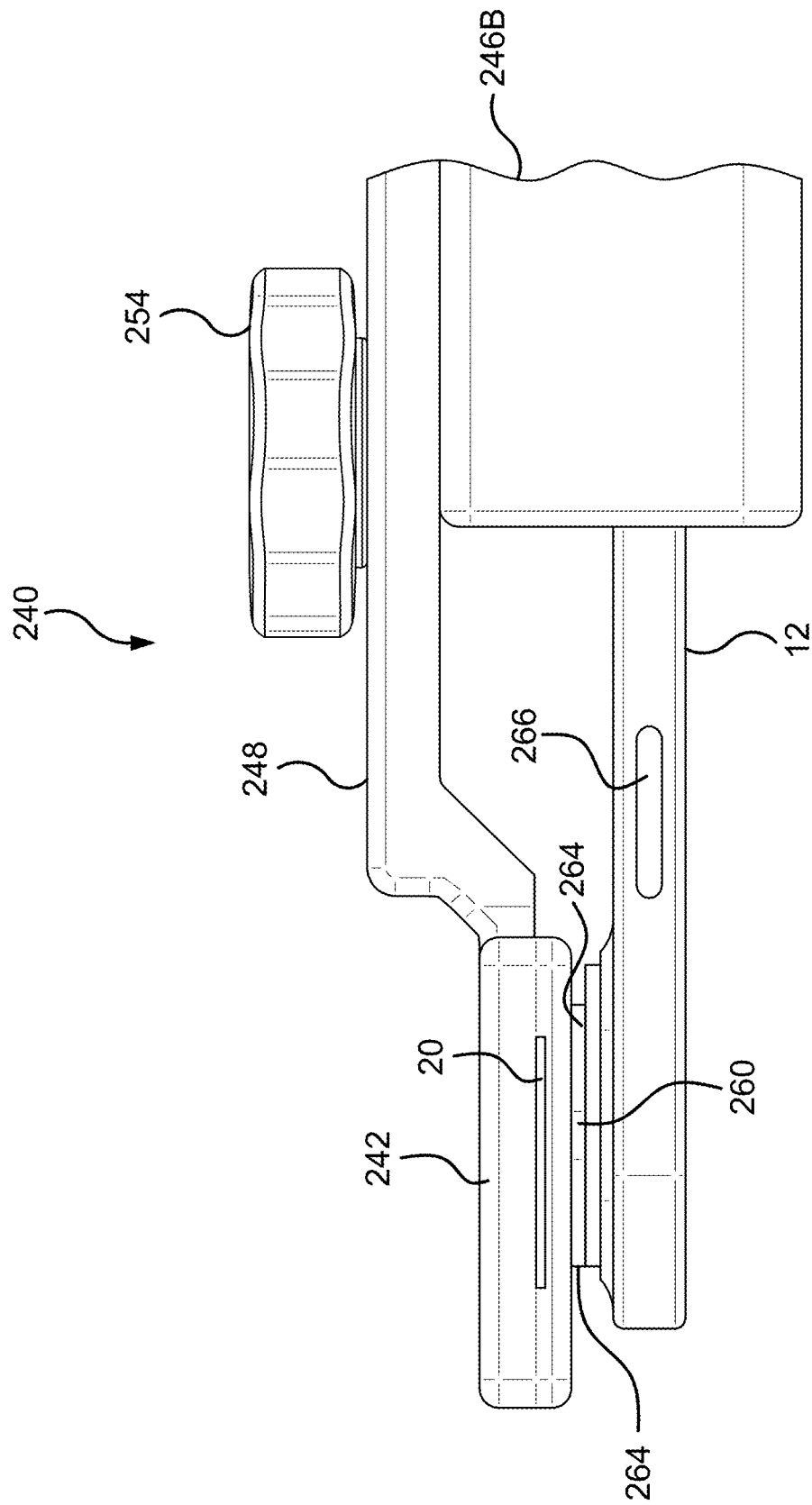
Figure 19I:
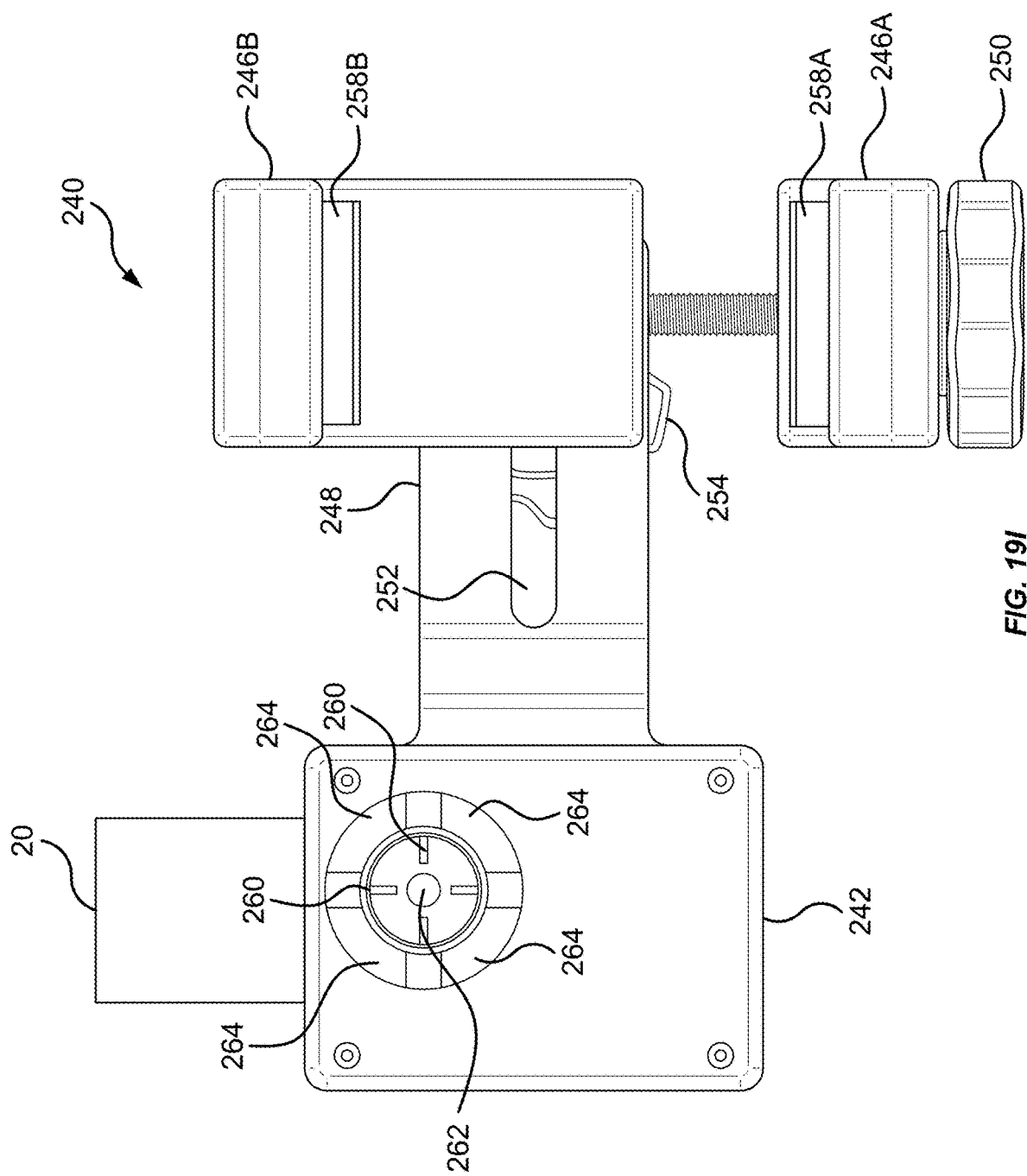

As shown in FIGS. 19G and I, the embodiment 240 may also include foam configured in annular segments 264 around the lens 262. These annular segments 264 substantially limit and/or restrict light from entering or leaving an area disposed between the lens 262 and camera associated with the smart device 12 while providing a cushion that significantly reduces damage to both the main body 242 and smart device 12 that can occur during operation.

FIG. 191) provides a partial front view of the embodiment 240 that shows threaded apertures 256A-B, through which the slider set screw 254 is screwed. The threaded apertures 256A-B provide further adjustability of the main body 242 in a y-direction along the length of the smart device 12, and thus the lens 262, in relation to the camera associated with the smart device 12, which can be used to accommodate and/or compensate for varying dimensions of the particular smart device 12 being used. As shown in FIGS. 19B, C, ER, and H, the arms 246A-B are positioned below buttons 266 associated with the smart device 12 so as not interfere with access to and/or activation of these buttons 266 during operation of the smart device 12.

Figure 20A:
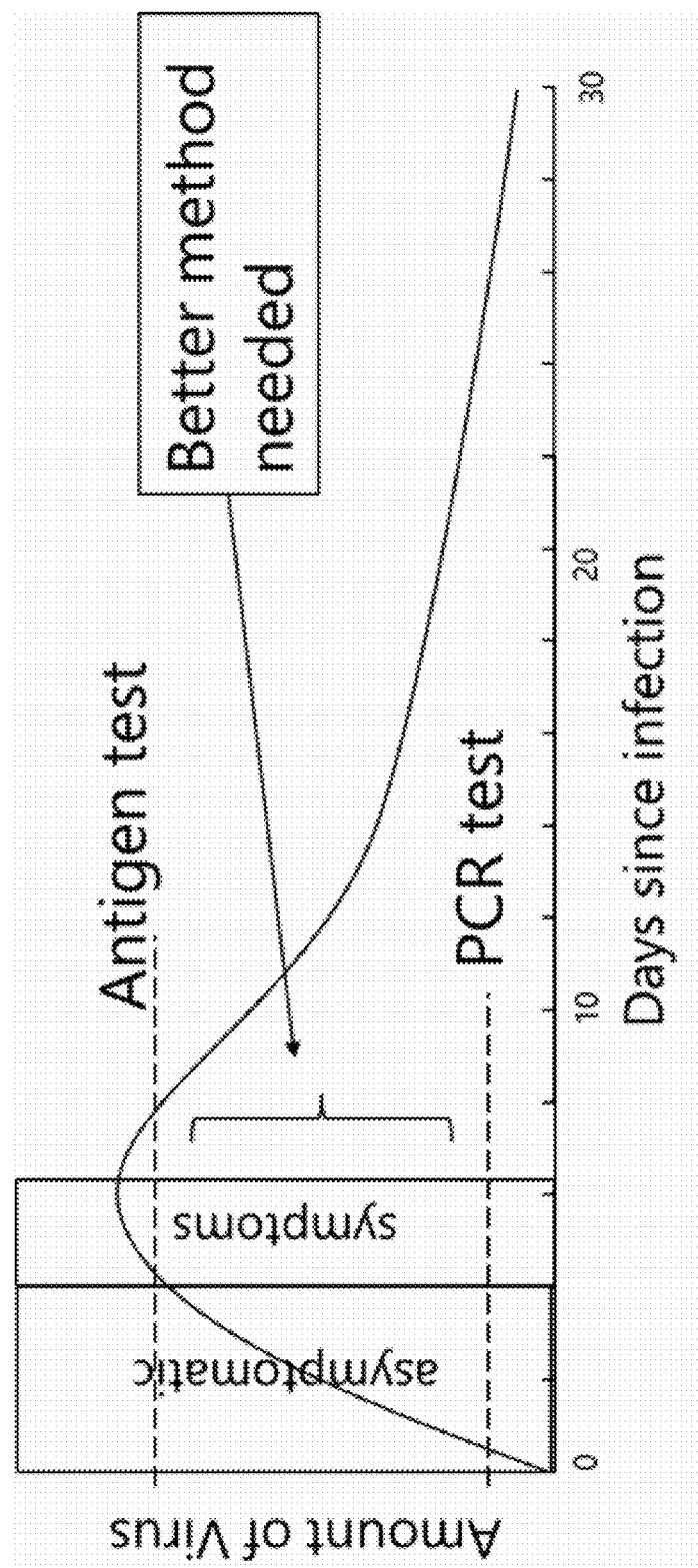
FIG. 20A shows a graph of an amount of virus as a function of a number of days since onset of a representative COVID-19 infection profile.
Figure 20B:
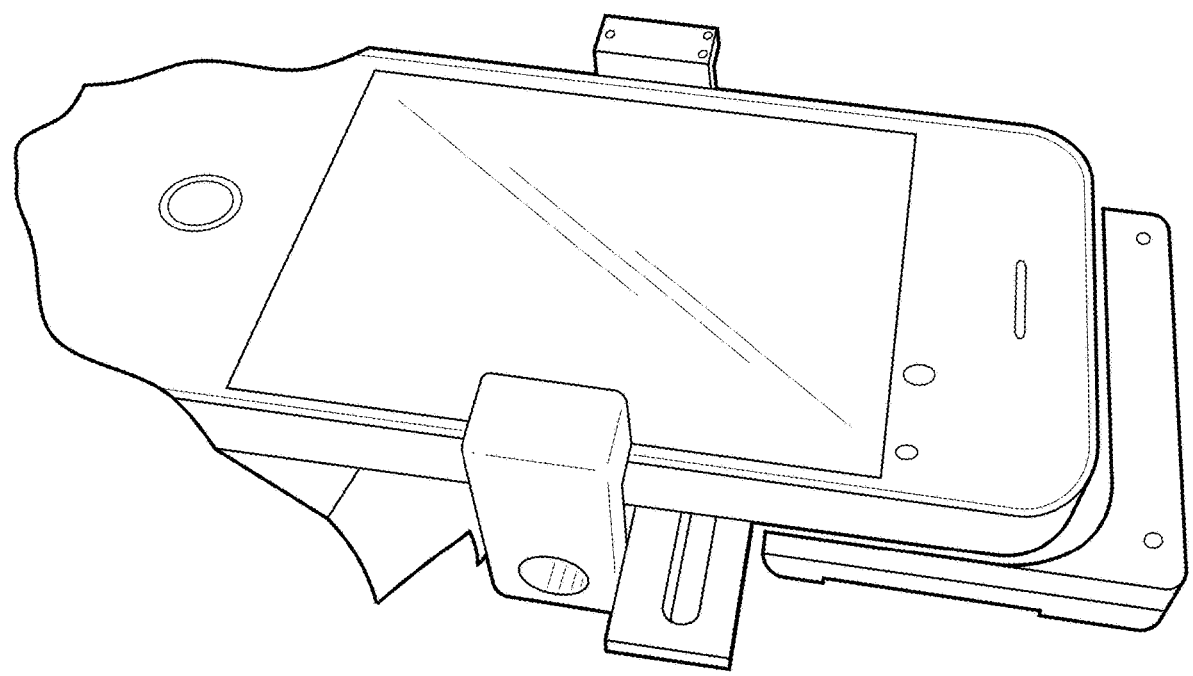
FIG. 20B shows an embodiment of the dark-field microscopy imaging apparatus attached to a smart device.
Figure 20C:
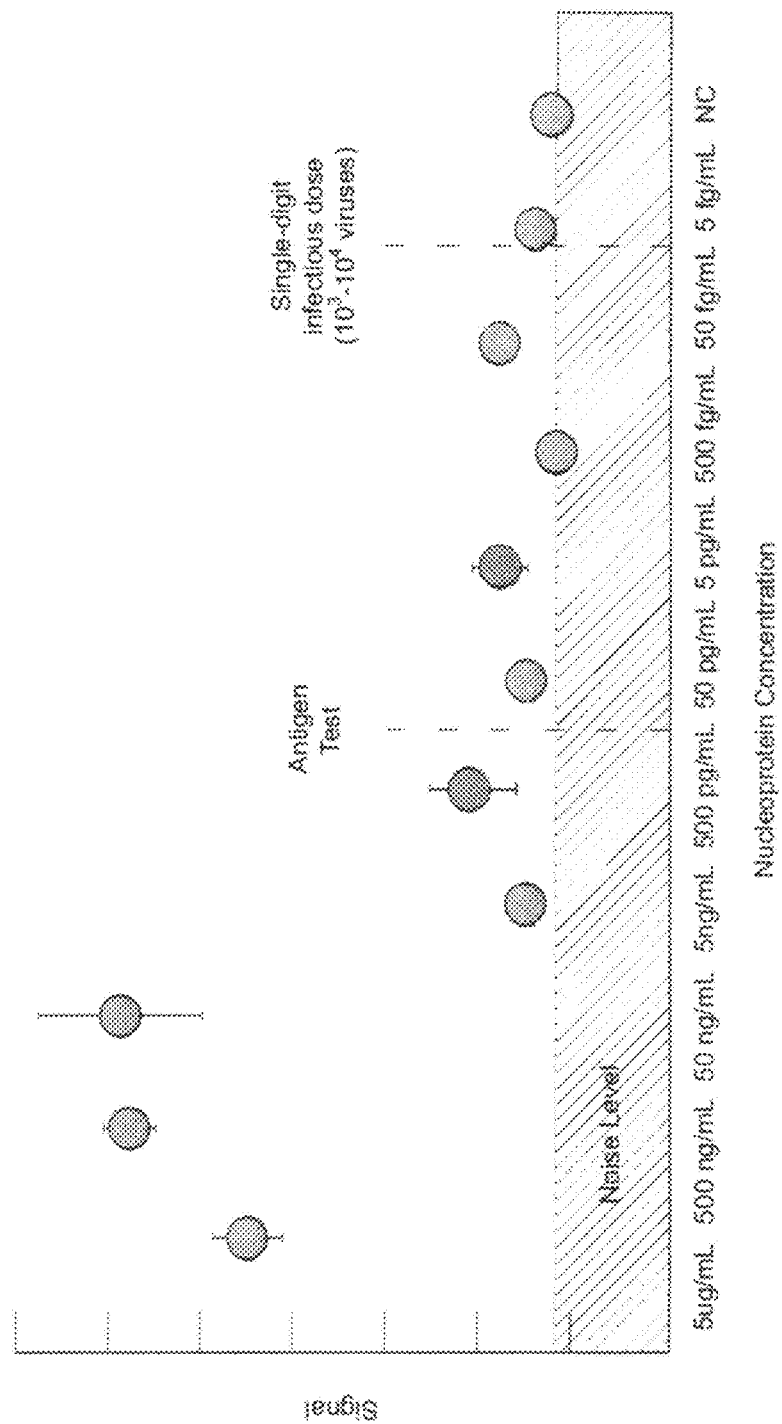
FIG. 20C shows a graph of signal strength as a function of nucleoprotein concentration.

FIG. 20A illustrates a graph of an amount of virus as a function of a number of days since onset of a representative COVID-19 infection profile. As indicated by the horizontal dotted lines, the polymerase chain reaction (PCR) test is appropriate for patients with a significantly lower concentration of viral bodies than the antigen test, which leaves a wide range of viral density without adequate testing modalities. The nanoscience-based dark-field microscopy imaging apparatus, an embodiment of which is shown attached to a smart device in FIG. 20B, effectively addresses this deficiency by providing home and/or point-of-care testing with the rapid speed of antigen testing, but with a substantial improvement in sensitivity. For example, as shown by vertical dotted lines in the graph of signal strength as a function of nucleoprotein concentration in FIG. 20C, the dark-field microscopy imaging apparatus is able to detect concentrations of approximately 1000-10,000 times less than that of antigen testing.

Figure 18:
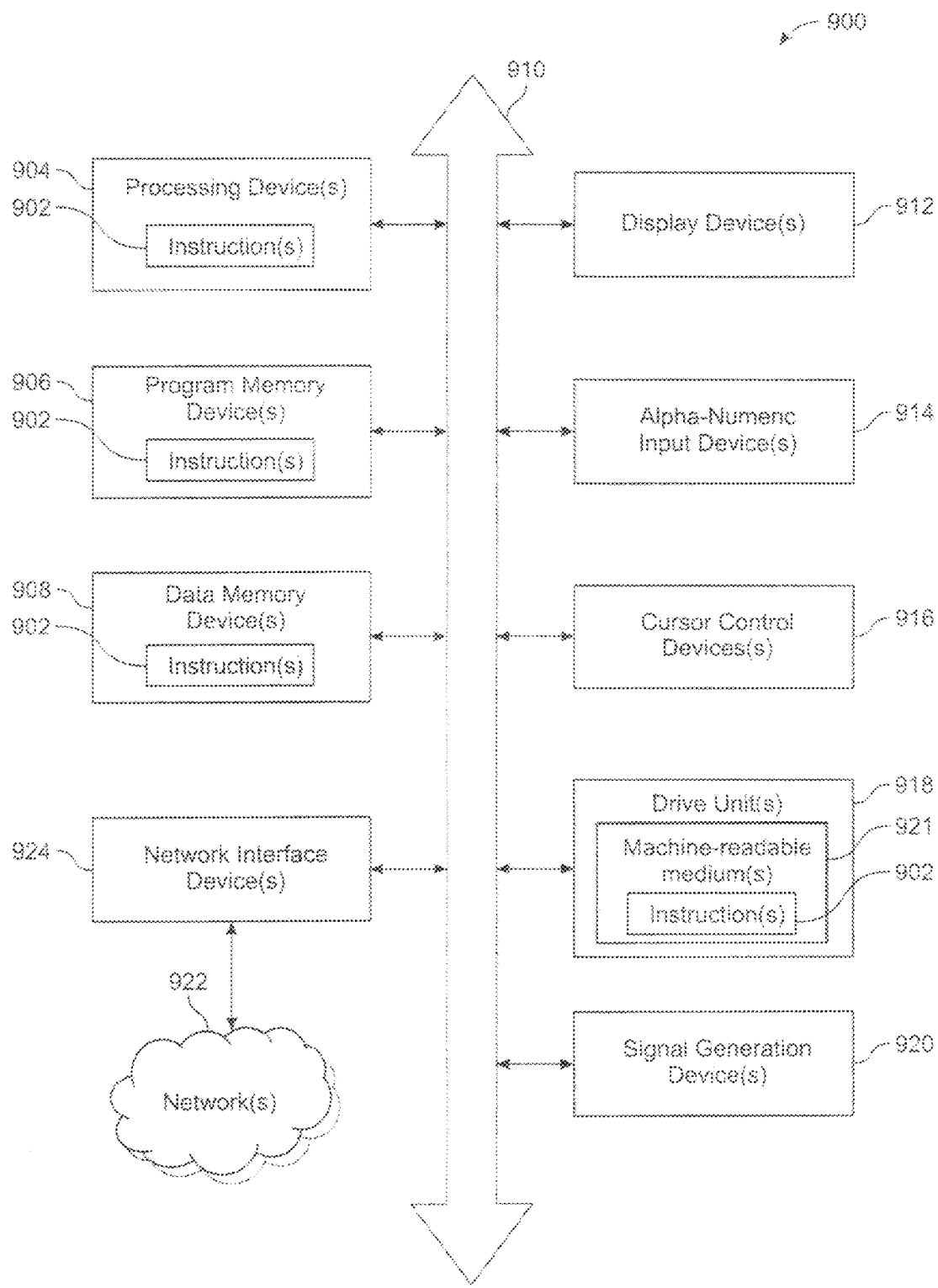
FIG. 18 is a block diagram of at least a portion of an exemplary machine in the form of a computing system that performs methods according to one or more embodiments disclosed herein.

One or more embodiments disclosed herein, or a portion thereof, may make use of software running on a computer or workstation. By way of example, only and without limitation, FIG. 18 is a block diagram of an embodiment of a machine in the form of a computing system 900, within which is a set of instructions 902 that, when executed, cause the machine to perform any one or more of the methodologies according to embodiments of the invention. In one or more embodiments, the machine operates as a standalone device; in one or more other embodiments, the machine is connected (i.e., via a network 922) to other machines. In a networked implementation, the machine operates in the capacity of a server or a client user machine in a server-client user network environment. Exemplary implementations of the machine as contemplated by embodiments of the invention include, but are not limited to, a server computer, client user computer, personal computer (PC), tablet PC, personal digital assistant (PDA), cellular telephone, mobile device, palmtop computer, laptop computer, desktop computer, communication device, personal trusted device, web appliance, network router, switch or bridge, or any machine capable of executing a set of instructions (sequential or otherwise) that specify actions to be taken by that machine.

The computing system 900 includes a processing device(s) 904 (e.g., a central processing unit (CPU), a graphics processing unit (GPU), or both), program memory device(s) 906, and data memory device(s) 908, which communicate with each other via a bus 910. The computing, system 900 further includes display device(s) 912 (e.g., liquid crystal display (LCD), flat panel, solid state display, or cathode ray tube (CRT). The computing system 900 includes input device s) 914 (e.g., a keyboard), cursor control devices) 916 (e.g., a mouse), disk drive unit-s) 918, signal generation device(s) 920 (e.g., a speaker or remote control), and network interface device(s) 924, operatively coupled together, and/or with other functional blocks, via bus 910.

The disk drive unit(s) 918 includes machine-readable medium(s) 926, on which is stored one or more sets of instructions 902 (e.g., software) embodying any one or more of the methodologies or functions herein, including those methods illustrated herein. The instructions 902 may also reside, completely or at least partially, within the program memory device(s) 906, the data memory device(s) 008, and/or the processing device(s) 904 during execution thereof by the computing system 900. The program memory device(s) 906 and the processing device(s) 904 also constitute machine-readable media. Dedicated hardware implementations such as, but not limited to, ASICs, programmable logic arrays, and other hardware devices can likewise be constructed to implement methods described herein. Applications that include the apparatus and systems of various embodiments broadly comprise a variety of electronic and computer systems. Some embodiments implement functions in two or more specific interconnected hardware modules or devices with related control and data signals communicated between and through the modules, or as portions of an ASIC. Thus, the example system is applicable to software, firmware, and/or hardware implementations.

The term "processing device" as used herein is intended to include any processor, such as, for example, one that includes a CPU (central processing unit) and/or other forms of processing circuitry. Further, the term "processing device" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the display device(s) 912, input device(s) 914, cursor control devices 916, signal generation device(s) 920, and the like, can be collectively referred to as an "input/output interface." and is intended to include one or more mechanisms for inputting data to the processing device(s) 904, and one or more mechanisms for providing results associated with the processing device(s). Input/output or V/O devices (including, but not limited to, keyboards (e.g., alpha-numeric input device(s) 914, display device(s) 912, and the like) can be coupled to the system either directly (such as via bus 910) or through intervening input/output controllers (omitted for clarity).

In an integrated circuit implementation of one or more embodiments of the invention, multiple identical dies are typically fabricated in a repeated pattern on a surface of a semiconductor wafer. Each such die may include a device described herein and may include other structures and/or circuits. The individual dies are cut or diced from the wafer, then packaged as integrated circuits. One skilled in the art would know how to dice wafers and package die to produce integrated circuits. Any of the exemplary circuits or method illustrated in the accompanying figures, or portions thereof, may be part of an integrated circuit. Integrated circuits so manufactured are considered part of this invention.

In accordance with various embodiments, the methods, functions, or logic described herein is implemented as one or more software programs running on a computer processor. Dedicated hardware implementations including, but not limited to, application specific integrated circuits, programmable logic arrays and other hardware devices can likewise be constructed to implement the methods described herein. Further, alternative software implementations including, but not limited to, distributed processing or component/object distributed processing, parallel processing, or virtual machine processing can also be constructed to implement the methods, functions or logic described herein.

The embodiment contemplates a machine-readable medium or computer-readable medium including instructions 902, or that which receives and executes instructions 902 from a propagated signal so that a device connected to a network environment 922 can send or receive voice, video, or data, and to communicate over the network 922 using the instructions 902. The instructions 902 are further transmitted or received over the network 922 via the network interface device(s) 924. The machine-readable medium also contains a data structure for storing data useful in providing a functional relationship between the data and a machine or computer in an illustrative embodiment of the systems and methods herein.

While the machine-readable medium 902 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform anyone or more of the methodologies of the embodiment. The term "machine-readable medium" shall accordingly be taken to include, but not be limited to: solid-state memory (e.g., solid-state drive (SSD), flash memory, etc.); read-only memory (ROM), or other non-volatile memory; random access memory (RAM), or other re-writable (volatile) memory; magneto-optical or optical medium, such as a disk or tape; and/or a digital file attachment to e-mail or other self-contained information archive or set of archives is considered a distribution medium equivalent to a tangible storage medium. Accordingly, the embodiment is considered to include anyone or more of a tangible machine-readable medium or a tangible distribution medium, as listed herein and including art-recognized equivalents and successor media, in which the software implementations herein are stored.

It should also be noted that software, which implement; the methods, functions and/or logic herein, are optionally stored on a tangible storage medium, such as: a magnetic medium, such as a disk or tape; a magneto-optical or optical medium, such as a disk; or a solid state medium, such as a memory automobile or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the disclosure is considered to include a tangible storage medium or distribution medium as listed herein and other equivalents and successor media, in which the software implementations herein are stored.

Although the specification describes components and functions implemented in the embodiments with reference to particular standards and protocols, the embodiments are not limited to such standards and protocols.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments are utilized and derived therefrom, such that structural and logical substitutions and changes are made without departing from the scope of this disclosure. Figures are also merely representational and are not drawn to scale. Certain proportions thereof are exaggerated, while others are decreased. Accordingly, the specification and drawings are to be regarded in an illustrative rather than a restrictive sense.

Such embodiments are referred to herein, individually and/or collectively, by the term "embodiment" merely for convenience and without intending to voluntarily limit the scope of this application to any single embodiment or inventive concept if more than one is in fact shown. Thus, although specific embodiments have been illustrated and described herein, it should be appreciated that any arrangement calculated to achieve the same purpose are substituted for the specific embodiments shown. This disclosure is intended to cover any and all adaptations or variations of various embodiments. (Combinations of the above embodiments, and other embodiments not specifically described herein, will be apparent to those of skill in the art upon reviewing the above description.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single embodiment. Thus, the following claims are hereby incorporated into the detailed description, with each claim standing on its own as a separate example embodiment.

The abstract is provided to comply with 37 C.F.R. § 1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single embodiment. Thus, the following claims are hereby incorporated into the Detailed Description, with each claim standing on its own as separately claimed subject matter.

Although specific example embodiments have been described, it will be evident that various modifications and changes are made to these embodiments without departing from the broader scope of the inventive subject matter described herein. Accordingly, the specification and drawings are to be regarded in an illustrative rather than a restrictive sense. The accompanying drawings that form a part hereof, show by way of illustration, and without limitation, specific embodiments in which the subject matter are practiced. The embodiments illustrated are described in sufficient detail to enable those skilled in the art to practice the teachings herein. Other embodiments are utilized and derived therefrom, such that structural and logical substitutions and changes are made without departing from the scope of this disclosure. This Detailed Description, therefore, is not to be taken in a limiting sense, and the scope of various embodiments is defined only by the appended claims, along with the full range of equivalents to which such claims are entitled.

Given the teachings provided herein, one of ordinary skill in the art will be able to contemplate other implementations and applications of the techniques of the disclosed embodiments. Although illustrative embodiments have been described herein with reference to the accompanying drawings, it is to be understood that these embodiments are not limited to the disclosed embodiments, and that various other changes and modifications are made therein b one skilled in the art without departing from the scope of the appended claims.

What is claimed is:

1. A dark-field microscopy imaging apparatus comprising:
    a main body, the main body comprising an aperture, the aperture configured to receive a wafer, the wafer configured to receive a sample under study;
    a circuit assembly, the main body configured to support the circuit assembly, the circuit assembly comprising illumination sources that emit light of different colors such that a total internal reflection is generated in the wafer;
    a lens, the main body configured to provide support for the lens; and
    a clamping assembly, the clamping assembly mechanically coupled to the main body such that the lens is selectively positionable with respect to a camera lens;
    wherein emitted light is configured to enter the wafer from at least one side thereof, and to propagate and homogenize throughout the wafer.

2. The dark-field microscopy imaging apparatus, as defined by claim 1, wherein the circuit assembly further comprises a processing device configured to control at least one of (a) illumination intensity associated with the illumination sources, (b) illumination timing associated with the illumination sources, (c) focusing the lens to enhance spectral resolution of the sample under study.

3. The dark-field microscopy imaging apparatus, as defined by claim 1, wherein the circuit assembly further comprises a blocking structure, the blocking structure directing illumination from the illumination sources, the blocking structure being at least one of (a) disposed on a side of the wafer opposing at least one of the illumination sources, (b) disposed between the at least one of the illumination sources and the side of the wafer, the blocking structure being at least one of (a) statically positionable, (b) manually positionable, (c) remotely positionable.

4. The dark-field microscopy imaging apparatus, as defined by claim 3, wherein the blocking structure comprises at least one of a (a) baffling structure, (b) prism, (c) lens, (d) mirror, (e) light guide.

5. The dark-field microscopy imaging apparatus, as defined by claim 1, wherein the apparatus locates a feature of interest associated with the sample under study based on a spectral characteristic, areas of interest being defined based on the spectral characteristic within the areas of interest, the defined areas of interest being ranked based on the spectral characteristic, a center of a field-of-view associated with the camera lens being repositioned at a center of a defined area of interest having a highest ranking, a digital zoom associated with a smart device being adjusted to fill the field-of-view with the defined area of interest having the highest ranking.

6. The dark-field microscopy imaging apparatus, as defined by claim 5, wherein the spectral characteristic comprises at least one of (a) object density, (b) size, (c) shape associated with a feature of interest.

7. The dark-field microscopy imaging apparatus, as defined by claim 1, wherein the clamping assembly comprises a slider assembly, the clamping assembly and slider assembly configured to enable selective positioning of the lens with respect to the camera lens in at least two dimensions.

8. The dark-field microscopy imaging apparatus, as defined by claim 7, wherein the clamping assembly and slider assembly are configured to enable selective positioning of the lens with respect to the camera lens in a third dimension.

9. The dark-field microscopy imaging apparatus, as defined by claim 1, wherein the wafer comprises at least one slanted side forming an angle other than 90 degrees with respect to at least one of a (a) top of the wafer, (b) bottom of the wafer.

10. The dark-field microscopy imaging apparatus, as defined by claim 1, wherein the camera lens is associated with at least one of a (a) smart device, (b) printed circuit board camera.

11. A method of dark-field microscopy imaging comprising:
    receiving a wafer in an aperture of a main body, the wafer configured to receive a sample under study;
    supporting a circuit assembly using the main body;
    emitting light of different colors by illumination sources such that a total internal reflection is generated in the wafer;
    supporting a lens using the main body; and
    mechanically coupling a clamping assembly to the main body such that the lens is selectively positionable with respect to a camera lens,
    wherein emitted light enters the wafer from at least one side thereof, and propagates and homogenizes throughout the wafer.

12. The method, as defined by claim 11, further comprising controlling at least one of (a) illumination intensity associated with the illumination sources, (b) illumination timing associated with the illumination sources, (c) focusing the lens to enhance spectral resolution of the sample under study.

13. The method, as defined by claim 11, further comprising directing illumination from the illumination sources using a blocking structure at least one of (a) disposed on a side of the wafer opposing at least one of the illumination sources, (b) disposed between the at least one of the illumination sources and the side of the wafer, the blocking structure being at least one of (a) statically positionable, (b) manually positionable, (c) remotely positionable.

14. The method, as defined by claim 13, wherein the blocking structure comprises at least one of a (a) baffling structure, (b) prism, (c) lens, (d) mirror, (e) light guide.

15. The method, as defined by claim 11, further comprising:
    locating a feature of interest associated with the sample under study based on a spectral characteristic;
    illuminating at least one of the illumination sources;
    defining areas of interest based on the spectral characteristic within the areas of interest;
    ranking the defined areas of interest based on the spectral characteristic;
    repositioning a center of a field-of-view associated with the camera lens at a center of a defined area of interest having a highest ranking; and
    adjusting a digital zoom associated with a smart device to fill the field-of-view with the defined area of interest having the highest ranking.

16. The method, as defined by claim 15, wherein the spectral characteristic comprises at least one of (a) object density, (b) size, (c) shape associated with a feature of interest.

17. The method, as defined by claim 11, further comprising selectively positioning the lens with respect to the camera lens in at least two dimensions using the clamping assembly and a slider assembly.

18. The method, as defined by claim 17, further comprising selectively positioning the lens with respect to the camera lens in a third dimension using the clamping assembly and slider assembly.

19. The method, as defined by claim 11, wherein the wafer comprises at least one slanted side forming an angle other than 90 degrees with respect to at least one of a (a) top of the wafer, (b) bottom of the wafer.

20. The method, as defined by claim 11, wherein the camera lens is associated with at least one of a (a) smart device, (b) printed circuit board camera.

* * * * *